United States Patent [19]

Ohnishi et al.

[11] Patent Number: 5,708,320
[45] Date of Patent: Jan. 13, 1998

[54] VIBRATORY GYROSCOPE

[75] Inventors: Kazumasa Ohnishi; Akira Satoh, both of Niigata-ken; Yoshiro Tomikawa, 2-2-3-1 Rinsenji, Yonezawa-shi, Yamagata-ken, all of Japan

[73] Assignees: Alps Electric Co., Ltd, Tokyo; Yoshiro Tomikawa, Yonezawa, both of Japan

[21] Appl. No.: 549,616

[22] Filed: Oct. 27, 1995

[30] Foreign Application Priority Data

Oct. 28, 1994 [JP] Japan .................. 6-289009
May 29, 1995 [JP] Japan .................. 7-130523

[51] Int. Cl.$^6$ ........................ H01L 41/08
[52] U.S. Cl. ............... 310/321; 73/505; 310/312; 310/333; 310/370; 310/367
[58] Field of Search .................. 310/312, 333, 310/370, 321; 73/505

[56] References Cited

U.S. PATENT DOCUMENTS

| | | | |
|---|---|---|---|
| 5,049,776 | 9/1991 | Ogawa | 310/333 |
| 5,166,571 | 11/1992 | Konno et al. | 310/333 |
| 5,216,315 | 6/1993 | Terada et al. | 310/329 |
| 5,396,144 | 3/1995 | Gupta et al. | 310/370 |
| 5,400,269 | 3/1995 | White et al. | 73/505 X |
| 5,451,828 | 9/1995 | Tomikawa et al. | 310/370 |

FOREIGN PATENT DOCUMENTS

| | | | |
|---|---|---|---|
| 0037488 | 3/1979 | Japan | 310/370 |
| 0170614 | 10/1982 | Japan | 310/370 |
| 0202113 | 8/1988 | Japan | 310/370 |
| 0236808 | 9/1989 | Japan | 310/370 |

OTHER PUBLICATIONS

Quartz Tuning Fork Using Overtone Flexure Modes, by S.S. Chuang, Proceeding 35th Ann Freq. Control Symposium. USAERADCOM, Ft Monmouth, N.J. 07703, May 27–29, 1981. pp. 130–143.

*Primary Examiner*—Mark O. Budd
*Attorney, Agent, or Firm*—Guy W. Shoup; Patrick T. Bever

[57] ABSTRACT

A vibratory gyroscope including an elongated vibrator having a central (neutral) axis (Y-axis), a drive unit for deforming the first direction such that the vibrator vibrates in a first (X) direction, an added mass attached to the vibrator at a position offset from the central axis in a second (Z) direction, and a detector formed on the vibrator. Rotation of the vibratory gyroscope about the second (Z) direction during vibration in the second direction causes Coriolis force to acting on the added mass in a direction parallel to the central axis. Because the added mass is offset from the central axis, a resulting vibration in the second (Z) direction is produced, which is detected by the detector. With this arrangement, the central axis of the vibrator is placed in parallel with the surface of rotation of the rotating system. Thus, rotations about two or three axes in each direction can be detected in such a manner that noise generation is prevented.

16 Claims, 22 Drawing Sheets

VIBRATORY GYROSCOPE

BACKGROUND OF THE INVENTION

1. Field of the Invention

This invention relates to gyroscopes for detecting the rotational angular velocity of an object, and in particular to vibratory gyroscopes which determine the rotational angular velocity by determining the Coriolis force acting on the object.

2. Description of the Related Art

Gyroscopes are used for detecting rotational angular velocity in car navigation systems, inertial navigation systems and attitude control systems for aircrafts and ships, attitude control systems for robots and unmanned vehicles and apparatuses for producing a stable image in TV cameras and video cameras.

The gyroscopes used in the foregoing various industrial applications must be small in size. Therefore, vibratory gyroscopes, which are typically smaller than other types of gyroscopes, have attracted attention.

FIG. 32 shows a conventional vibratory gyroscope. The vibratory gyroscope comprises a columnar vibrator 1 made of isoelastic metal (Elinvar) to which a drive piezoelectric device 2 and a detection piezoelectric device 3 are secured. When the vibrator 1 is rotated about a Z-axis while the drive piezoelectric device 2 supplies, to the vibrator 1, bending vibrations in the direction of an X-axis, Coriolis force acts on the vibrator 1 such that the vibrator 1 is vibrationally deformed in the Y-axis direction. The amount of deformation in the Y-axis direction is detected by the piezoelectric device 3 as a voltage signal.

Assuming that the mass of the vibrator 1 is m, the velocity of the applied vibrations in the X-axis direction is v (a vector value) and the angular velocity about the Z-axis is ω, the Coriolis force F (a vector value) is as follows:

$$F = 2m(v \times \omega)$$

where symbol × indicates a vector cross product.

As described above, the Coriolis force F is proportional to the angular velocity ω. Therefore, if the deforming vibrations of the vibrator 1 in the Y-axis direction are converted into a voltage signal by the detection piezoelectric device 3, the angular velocity ω can be obtained by measuring the voltage signal.

However, because the vibratory gyroscope shown in FIG. 32 has a structure in which the vibrator 1 is driven to vibrate in the X-axis direction and is deformed in the Y-axis direction by the Coriolis force, only an angular velocity ω about the Z-axis (that is, the longitudinal or major axis of the vibrator 1) can be detected. Therefore, the vibratory gyroscope can only be mounted on a surface of a rotating object which is perpendicular to the Z-axis. This restricts the use of the vibratory gyroscope in a variety of apparatuses in which such a surface is not readily available.

Moreover, if it is desired to detect rotational angular velocity in two- or three-dimensional directions using the vibratory gyroscope of the foregoing type, two or more vibrators 1 of the type shown in FIG. 32 must be arranged such that the major axes of the respective vibrators 1 are perpendicular to each other. Further, when it is desired to detect rotational angular velocity in three-dimensional directions, two of the vibratory gyroscopes may be arranged in the plane of a substrate, but it is necessary to arrange the third vibratory gyroscope such that it projects perpendicular to the substrate. In this arrangement, a space required for the three vibratory gyroscopes is substantially increased to accommodate the third vibratory gyroscope.

Furthermore, the vibratory gyroscope shown in FIG. 32 is only able to detect bending vibrations due to the Coriolis force—that is, the vibratory gyroscope cannot detect torsional vibrations. Since the vibration mode is limited only to bending vibrations, the applications of the conventional vibratory gyroscope is narrowed undesirably.

In addition, the above-mentioned conventional vibratory gyroscope is only able to detect the angular velocity of a rotating system about one axis. In order to detect the angular velocity of rotating system about two axes, two conventional vibrators must be employed. In order to detect angular velocity of a rotating system about three axes, three conventional vibrators must be employed.

SUMMARY OF THE INVENTION

In order to overcome the foregoing problems, an object of the present invention is to provide a vibratory gyroscope in which Coriolis force acting in a first direction produces deformation of a vibrator in a second direction perpendicular to the first direction so that a major axis of the vibrator is disposed in parallel to the rotational surface of the rotating system (i.e., perpendicular to the axis of rotation), thereby allowing the vibrator to be freely mounted the on the rotational surface.

Another object of the present invention is to provide a vibratory gyroscope that uses an added mass so as to detect the angular velocity of a rotating system about an axis other than the major axis of the vibrator and as well as to eliminate an influence of noise on the rotating system.

Another object of the present invention is to stably drive the vibratory gyroscope and stably detect rotations by providing a plurality of vibrators and by vibrating and deforming each vibrator in symmetrical directions.

Another object of the present invention is to detect rotations in each direction about two or three axes using a single vibratory gyroscope.

According to one aspect of the present invention, there is provided a vibratory gyroscope including a vibrator having a central (neutral) axis, first piezoelectric elements (drive means) mounted on the vibrator for deforming and vibrating the vibrator in a first direction, an added mass for causing Coriolis force acting on the vibrator in a second direction (perpendicular to the first direction) when the vibrator is placed in a rotating system to act on a position deviated from the central axis of the vibrator to deform and vibrate the vibrator, and second piezoelectric elements (detection means) for detecting deformation and vibrations of the vibrator.

According to another aspect of the present invention, there is provided a vibratory gyroscope including a plate-like vibrator having a central axis, drive means for deforming and vibrating the vibrator in a first direction along the surface of the plate, an added mass for causing Coriolis force acting in a direction perpendicular to the first direction in the surface of the vibrator when the vibrator is placed in a rotating system about an axis perpendicular to the surface of the vibrator to act on a position deviated from the central axis of the vibrator to deform and vibrate the vibrator, and detection means for detecting deformation and vibrations of the vibrator.

In the foregoing embodiment, one or more grooves are cut into a flat member, thereby separating the flat member into a plurality of parallel vibrators separated by the grooves. Added masses are provided for each of the plurality of the vibrators, and the drive means of each of the vibrators are controlled to bendingly-vibrate in opposite phases.

According to another aspect of the present invention, there is provided a vibratory gyroscope including a vibrator having a central axis, drive means for contracting, expanding and deforming the vibrator in a direction of the central axis of the vibrator, an added mass for causing Coriolis force acting on the vibrator in a direction perpendicular to the first direction when the vibrator is placed in a rotating system about an axis perpendicular to the central axis to act on a position deviated from the central axis of the vibrator to torsionally deform the vibrator, and detection means for detecting torsional vibrations of the vibrator.

In each of the foregoing aspects, the added mass can be formed by securing, to a leading portion or the like of the vibrator, an individual mass (a weight) at a position deviated from the central axis.(an axis passing through the center of gravity of the cross section of the vibrator, that is, a neutral axis of the vibrator). The added mass may be formed by forming a cutting portion or a groove in the leading portion or the like of the vibrator to change the distribution of masses in the direction of the cross section with respect to the central axis. The added mass can also be formed by bending the leading portion of the vibrator.

According to the present invention, the vibrator is deformed and vibrated using piezoelectric devices, and piezoelectric devices are also used to detect vibrational components of the vibrator caused by the Coriolis force. The vibrator may be formed by applying a piezoelectric device serving as a portion of the drive means or a piezoelectric device serving as a portion of the detection means to isoelastic metal such as Elinvar. The vibrator may be formed by stacking piezoelectric material (piezoelectric ceramic) on a plate-like member made of isoelastic metal such as Elinvar and by applying or stacking a drive electrode serving as a portion of the drive means or a detection electrode serving as a portion of the detection means on the piezoelectric material. In the examples below, the vibrator is made of a piezoelectric material, such as piezoelectric ceramic or crystal, the crystal orientation of which is realized by a Z-crystal plate at a cut angle rotated +2° about the X-axis. Furthermore, a drive electrode serving as a portion of the drive means and a drive electrode serving as a portion of the detection means are applied or stacked on the surface of the piezoelectric material. The drive means according to the present invention includes a drive electrode provided for the piezoelectric material and a drive power source for supplying high-frequency electric power. The detection means includes a detection electrode provided for the piezoelectric material and a detection output terminal. In the case where the different detection voltages (or electric currents) are compensated, a differential circuit, a subtraction circuit or a phase difference circuit is, as a compensation means, provided for the detection means. Furthermore, an addition means for adding detection outputs in the same phase may be provided.

In the following description, the first direction is the same direction as the drive direction in which the vibrator is vibrated, whereas the second direction is a direction perpendicular to the first direction. The second direction is the direction of the axis of rotation of the vibratory gyroscope. The third direction is a direction perpendicular to each of the first direction and the second direction, the third direction being the direction of the major (central) axis of the vibrator.

According to another aspect of the present invention, there is provided a vibratory gyroscope including: a vibrator having a central axis aligned in the third direction, drive means for deforming and vibrating the vibrator in the first direction, an added mass for causing Coriolis force acting on the vibrator when the vibrator is placed in a rotating system to act on a position deviated from the central axis of the vibrator to deform and vibrate the vibrator in the first direction, and detection means for detecting deformation and vibrations of the vibrator in the first direction.

The foregoing vibratory gyroscope is arranged such that the vibrator is vibrated in the first direction due to the Coriolis force in the rotating system and the vibration component is detected. When the vibratory gyroscope is given the rotations of the vibrator about the major axis, vibrations in the second direction are generated in the vibrator as well as the foregoing vibrations in the first direction. Therefore, the piezoelectric device or the detection electrode of the detection means is disposed at a position at which it is capable of detecting only the component in the first direction so that superimposing of the vibration component in the second direction on the desired detection output is prevented.

In the case where the piezoelectric device or the detection electrode detects vibrations in the second direction, the detection means may have electrodes so disposed as to be capable of detecting a vibration component in the first direction and compensating a detection output due to a vibration component in the second direction, or a differential means (a differential circuit) may be disposed.

Furthermore, detection means for detecting a vibration component generated in the vibrator in a second direction perpendicular to the first direction due to Coriolis force given in a rotating system about a major axis of the vibrator may be provided in addition to the detection means for detecting the vibration component in the first direction so that the two detection means respectively detect rotations about two axes.

In each aspect of the present invention, the vibratory gyroscope can be formed by disposing one flat or columnar vibrator. If two or more vibrators are disposed in parallel and as well as the vibrators are separated from each other by grooves formed in an elastic member so as to cause each vibrator to be vibrated in a symmetrical mode in which the amplitudes are in the opposite directions, vibrations of each vibrator can be stabilized.

In the foregoing case, the vibratory gyroscope includes a plurality of vibrators, drive means for deforming and vibrating the plurality of the vibrators in opposite amplitude directions in a first direction, added masses for causing Coriolis force acting on each of the vibrators when the vibrators are placed in a rotating system to act on a position deviated from the central axis of the vibrators to deform and vibrate the vibrators in opposite amplitude directions in the first direction, and detection means for detecting deformation and vibrations of at least one vibrator in the first direction.

In the foregoing case, it is preferable that three vibrators are provided, right and left vibrators and a central vibrator are deformed and vibrated by the drive means in opposite amplitude directions in a first direction (X), in which the vibrators are arranged, and the right and left vibrators are deformed and vibrated in opposite amplitude directions in the first direction (X) due to the added mass when Coriolis force acts on the right and left vibrators.

It is also preferable that three vibrators are provided, right and left vibrators and a central vibrator are deformed and vibrated by the drive means in opposite amplitude directions in the first direction (Z), in which the vibrators are arranged, and the right and left vibrators are deformed and vibrated in opposite amplitude directions in the first direction (Z) due to the added mass when Coriolis force acts on the right and left vibrators.

Also in the case where a plurality of vibrators are provided, the detection means may have electrodes so disposed as to detect a vibration component in the first direction and compensating a detection output due to a vibration component in a second direction when each of the vibrator is vibrated in the second direction perpendicular to the first direction due to Coriolis force applied to system rotating about a major axis (Y) of the vibrator.

A detection means for detecting a vibration component generated in the vibrator in a second direction perpendicular to the first direction due to Coriolis force given in a rotating system about a major axis (Y) of the vibrator is provided in addition to the detection means for detecting the vibration component in the first direction, and the two detection means enable rotations about two axes to be detected individually.

An example of the structure capable of detecting rotations about the two axes has a structure such that three vibrators are provided, right and left vibrators and a central vibrator are deformed and vibrated by the drive means in opposite amplitude directions in the first direction, the right and left vibrators are deformed and vibrated in opposite amplitude directions in the first direction due to the added mass when Coriolis force acts on the right and left vibrators, and the right and left vibrators and the central vibrator are deformed and vibrated in opposite amplitude directions in the second direction perpendicular to the first direction when Coriolis force is given from a rotating system about a major axis.

According to the present invention, one vibratory gyroscope is able to detect rotations about each of three axes that are perpendicular to one another.

An example of the foregoing structure includes a plurality of vibrators of a first set and a plurality of vibrators of a second set which are deformed and vibrated due to a piezoelectric effect and which extend in opposite directions, drive means for deforming and vibrating the plurality of the vibrator of the first set in opposite amplitude directions in the first direction (X), added masses for causing Coriolis force acting on the vibrators of the first set when the vibrators are placed in a rotating system to act on a position deviated from the central axis of each of the vibrators to deform and vibrate the vibrators of the first set in opposite amplitude directions in the first direction (X), detection means for detecting deformation and vibrations of the vibrators of the first set in the first direction (X), detection means for detecting a vibration Component given to the vibrators of the first set in a second direction (Z) perpendicular to the first direction due to Coriolis force given in a rotating system about a different axis (Y), drive means for deforming and vibrating the plurality of the vibrators of the second set in opposite amplitude directions in the second direction (Z) perpendicular to the first direction, added masses for causing Coriolis force acting on the vibrators of the second set when the vibrators are placed in a rotating system to act on a position deviated from the central axis of each of the vibrators to deform and vibrate the vibrators of the second set in opposite amplitude directions in the second direction (Z), and detection means for detecting deformation and vibrations of the vibrators of the second set in the second direction (Z) so that rotations about three axes are detected individually.

Other and further objects, features and advantages of the invention will be evident from the following detailed description of the preferred embodiments in conjunction with the attached drawings.

BRIEF DESCRIPTION OF THE DRAWINGS

FIGS. 10A and 10B are diagrams showing a modification of the second example, in which FIG. 10A is a plan view of the vibratory gyroscope, and FIG. 10B is a side view of the same;

FIGS. 17A and 17B are diagrams showing the vibration mode of the vibrator according to the fifth example, in which FIG. 17A shows the drive vibration mode and FIG. 17B shows the detection vibration mode;

FIGS. 20A and 20B are diagrams showing vibration modes of the vibrator according to a sixth example, in which FIG. 20A shows a drive vibration mode and FIG. 20B shows a detection vibration mode;

FIGS. 23A and 23B are diagrams showing vibration modes of the vibrator according to the seventh example, in which FIG. 23A shows the drive vibration mode, and FIG. 23B shows the detection vibration mode;

FIGS. 26A, 26B and 26C are diagrams showing vibration modes of the vibrator according to the eighth example, in which FIG. 26A shows the drive vibration mode, FIG. 26B shows the detection vibration mode of the rotations about the Z-axis, and FIG. 26C shows the detection vibration mode of the rotations about the Y-axis;

FIGS. 29A, 29B, 29C and 29D are diagrams showing vibration modes of the vibrator according to the ninth example, in which FIG. 29A shows the drive vibration mode, FIG. 29B shows the detection vibration mode of the rotations about the X-axis, FIG. 29C shows the detection vibration mode of the rotations about the Y-axis, and FIG. 29D shows the detection vibration mode of the rotations about the Z-axis;

FIGS. 30A and 30B are diagrams showing the polarizing directions and the configuration of the electrodes of the piezoelectric material forming the vibrator according to the ninth example, in which FIG. 30A is a cross sectional view taken along line XXXA—XXXA of FIG. 28, and FIG. 30B is a cross sectional view taken along line XXXB—XXXB of FIG. 28;

DESCRIPTION OF THE PREFERRED EMBODIMENTS

Figure 1:
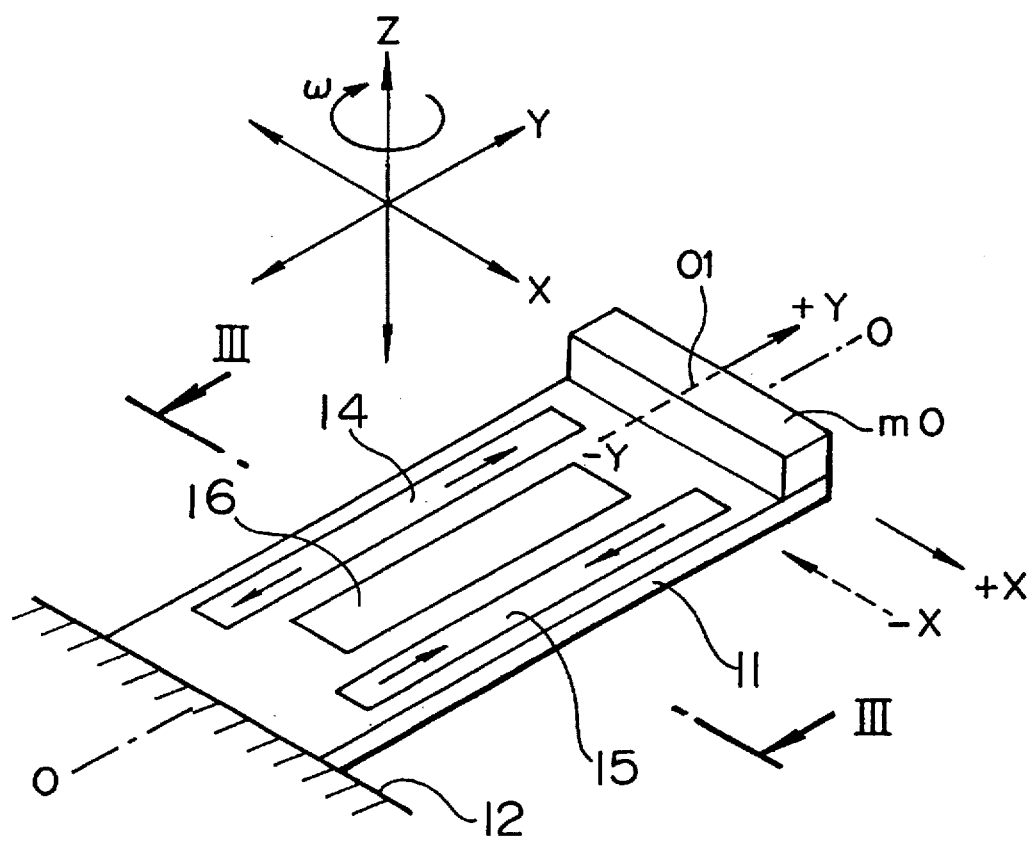
FIG. 1 is a perspective view showing a vibratory gyroscope according to a first example of the present invention.

In accordance with the present invention, a mass is added to a vibrator which is offset from a central axis of the vibrator. When the vibrator is vibrated in a first orthogonal direction perpendicular to the axis and rotated around an axis extending in a second orthogonal direction which is also perpendicular to the axis, the resulting Coriolis force acts on the added mass in a direction parallel to the central axis and perpendicular to the first and second directions. Because the added mass is offset from the central axis, the Coriolis force acts at a position deviated from the central axis of the vibrator. Therefore, the vibrator is deformed in the second direction due to the bending moment caused by the Coriolis force.

If the Coriolis force acts in a direction parallel to the central axis of a plate-like vibrator, the vibrator is bendingly-vibrated due to the foregoing moment. By detecting the deformation (that is, either deformation velocity or amount of deformation) caused from the bending vibration, the angular velocity of the vibrator can be detected. If the vibratory gyroscope is formed from a plate member, one or more parallel grooves may be formed in the plate member to form a plurality of vibrators to which separate driving forces can be applied so as to cause bending-vibrations the plurality of the vibrators in different phases by the Coriolis force. In a case where one plate member is provided with three parallel vibrators, the right and left vibrators and the central vibrator can be vibrated in opposite phases. In this vibration mode, the stresses due to vibrations in the plate member can be balanced and, thus, stable vibrations can be generated. By changing the length of the central vibrator by trimming, the specific frequency can be set/adjusted. In the case where three vibrators are formed, the base of the plate member is rigidly supported in a cantilever method.

In the case where the added mass is provided and the vibrator is bending-deformed due to Coriolis force, the surface of the vibrator can be placed in parallel to the surface of rotation (perpendicular to the axis of rotation) of the rotating system for detecting the angular velocity. Therefore, the vibratory gyroscope can be disposed efficiently in a thin apparatus.

In the case where the added mass is provided for the vibrator having the major (central) axis and, therefore, the Coriolis force acts in a direction deviated from the central axis of the vibrator and perpendicular to the central axis, the vibrator is torsionally vibrated. By detecting the torsional vibrations, the angular velocity can be detected. By torsionally vibrating the vibrator in place of bending-vibrating the same, the vibrator can be simply supported, for example, at the central portion thereof. Also in the foregoing case, the central axis of the major axis can be placed with respect to the surface of rotation of the rotating system. Thus, an optimum structure for use in a thin apparatus can be realized.

Figure 32:
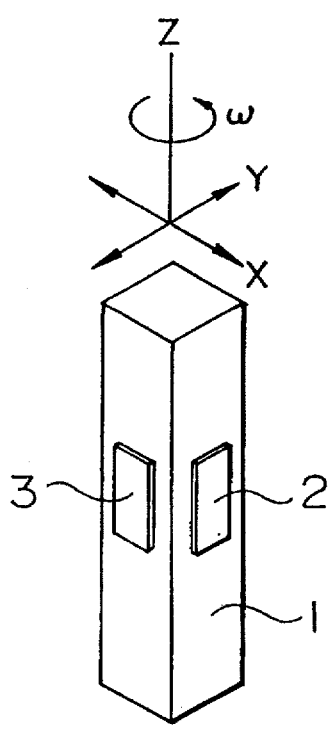
FIG. 32 is a perspective view showing a conventional vibratory gyroscope using a columnar vibrators.

That is, the vibratory gyroscope according to the present invention, which is capable of bending-deforming the plate-like vibrator or capable of torsionally-deforming the vibrator due to the added mass, is able to detect the angular velocity on the surface of rotation which is parallel to a substrate when the vibratory gyroscope is mounted in such a manner that its axis direction is in parallel to the substrate. On the other hand, a vibratory gyroscope having no added mass and adapted to a bending vibration mode as shown in FIG. 32 is only able to detect the angular velocity about an axis running parallel to the substrate if it is mounted in such a manner that its Z-axis is in parallel to the substrate. Therefore, if the vibratory gyroscope according to the present invention and provided with the added mass and the bending-vibration type vibratory gyroscope having no added mass and structured as shown in FIG. 32 are, in parallel, mounted on a substrate, the angular velocity components in the two directions can be detected by the two vibratory gyroscopes. Since all vibrators can be mounted in parallel to the substrate, a thin detection apparatus can be formed which is capable of detecting the two dimensional directions. Furthermore, an apparatus capable of detecting the angular velocity in the three-dimensional directions and having a thin structure can be formed.

Assuming that the direction in which the vibrator is driven is the first direction, the vibratory gyroscope according to the present invention has the added mass disposed at a position deviated into the first direction. In a vibrator according to any of examples shown in FIGS. 13, 16, 19 and 25 and vibrators of a first set (i) according to an example shown in FIG. 28, the first direction, in which the vibrator is vibrated, is the X direction, and the added mass is disposed at a position deviated to the X direction. Therefore, the vibrator is vibrated in the X direction, which is the first direction, due to the Coriolis force acting in the Y direction. The vibrator according to the example shown in FIG. 22 and each of vibrators in a second set (ii) shown in FIG. 28, has the structure that the direction, in which the vibrator is vibrated, is the Z direction, and the added mass is disposed at a position deviated to the Z direction. Therefore, the vibrator is vibrated in the Z direction due to the Coriolis force acting in the Y direction.

When the vibrator is driven to vibrate in a first direction (the X or Z direction), the Coriolis force generated in the rotating system acts as a Component in a direction perpendicular to the drive direction (the first direction). The present invention includes a structure such that the vibrator is vibrated in the first direction, which is the same direction as the drive direction, due to the Coriolis force. Thus, the Coriolis force acting on the vibrator from a rotating system other than the rotating system to be detected is not detected as noise.

Figure 13:
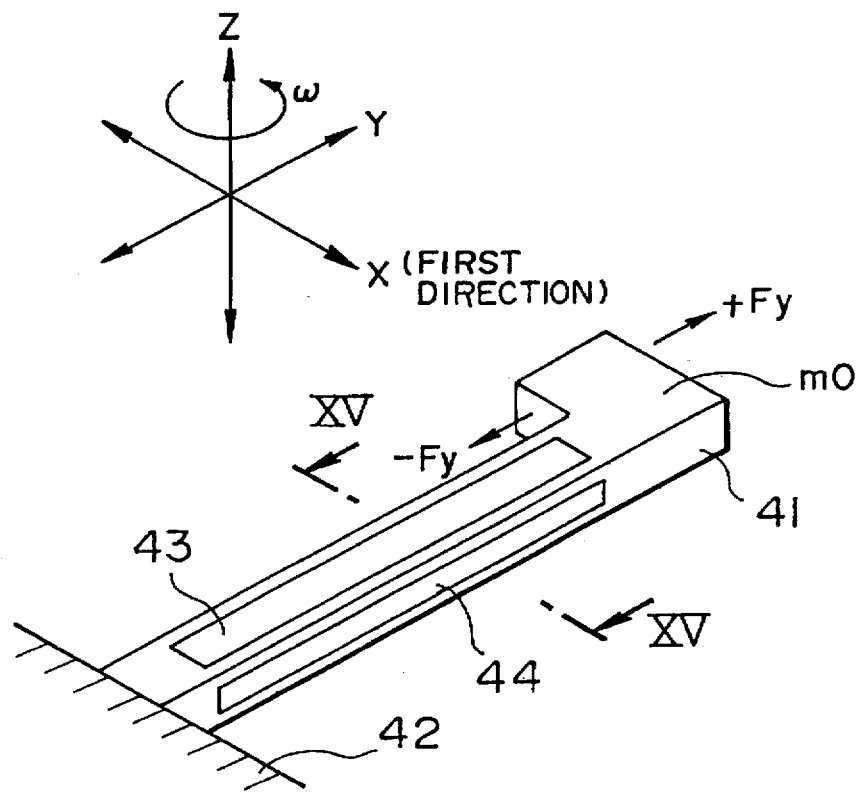
FIG. 13 is a perspective view showing a vibratory gyroscope according to a fourth example of the present invention.

In the case where the vibrator is vibrated in the X direction as shown in FIG. 13, the added mass is disposed at a position deviated in the X direction with respect to the central axis of the vibrator. Thus, the vibrator is, due to the Coriolis force, vibrated in the X direction which is the same as the drive direction. By detecting the foregoing vibrations, rotations about the Z-axis can be detected. When rotations about the Y-axis are applied to the vibrator, the Coriolis force generated due to the foregoing rotations acts in the Z direction, which is perpendicular to the drive direction X. The component of the Coriolis force in the X direction caused by rotation about the Y-axis is zero. Therefore, detection of only the vibrations in the X direction prevents detection of the rotations about the Y-axis but enables only the angular velocity due to the rotations about the Z-axis to be obtained.

As described above, according to the present invention, the angular velocity in a desired rotating system is detected by making the direction, in which the vibrator is vibrated, coincide with the drive direction. Therefore, even if Coriolis force of an external rotating system acts on the vibrator, the component of force of the Coriolis force in the drive direction is zero. Thus, detection of a desired rotating system can easily be performed.

The Coriolis force given in a rotating system about a predetermined axis causes the vibrator to be vibrated in the first direction, which is the drive direction. Furthermore, the Coriolis force of a rotating system about another axis causes the vibrator to be vibrated in the second direction which is perpendicular to the first direction. Therefore, by individually detecting the vibrations of the vibrator in the first direction and those in the second direction, the Coriolis forces respectively given from rotating systems about two axis perpendicular to each other can be detected.

The vibratory gyroscope may include one or more vibrators.

When a plurality of vibrators are provided and the vibrators are symmetrically vibrated in the opposite amplitude directions, the vibrations for driving the vibrator and the vibrators for detection can be stabilized. In the case where three parallel vibrators are integrally formed from one elastic member and right and left vibrators and the central vibrator are vibrated in the opposite amplitudes, the support-side elastic member, in which the vibrator is not formed, is not affected by the vibrations and the portion can be stabilized. Therefore, the base of the elastic member can be supported by a rigid (cantilever) method. Thus, a simple structure may be used to support the vibratory gyroscope.

As described above, one vibrator or vibrators in one set are able to detected Coriolis forces and angular velocities in a rotating system about two axes. However, one vibrator or vibrators in one set cannot detect Coriolis forces in each of rotating systems about three axes. The reason for this is that although the Coriolis force can be obtained as components of the perpendicular Y and Z directions that are perpendicular to the X direction in a case where the vibrator is vibrated in the X direction, the component of the Coriolis force in the X direction, which is the same direction as the drive direction, is always zero. That is, only the Coriolis force as the components in the two axial directions except the direction, in which the vibrator is vibrated, can be detected.

Figure 28:
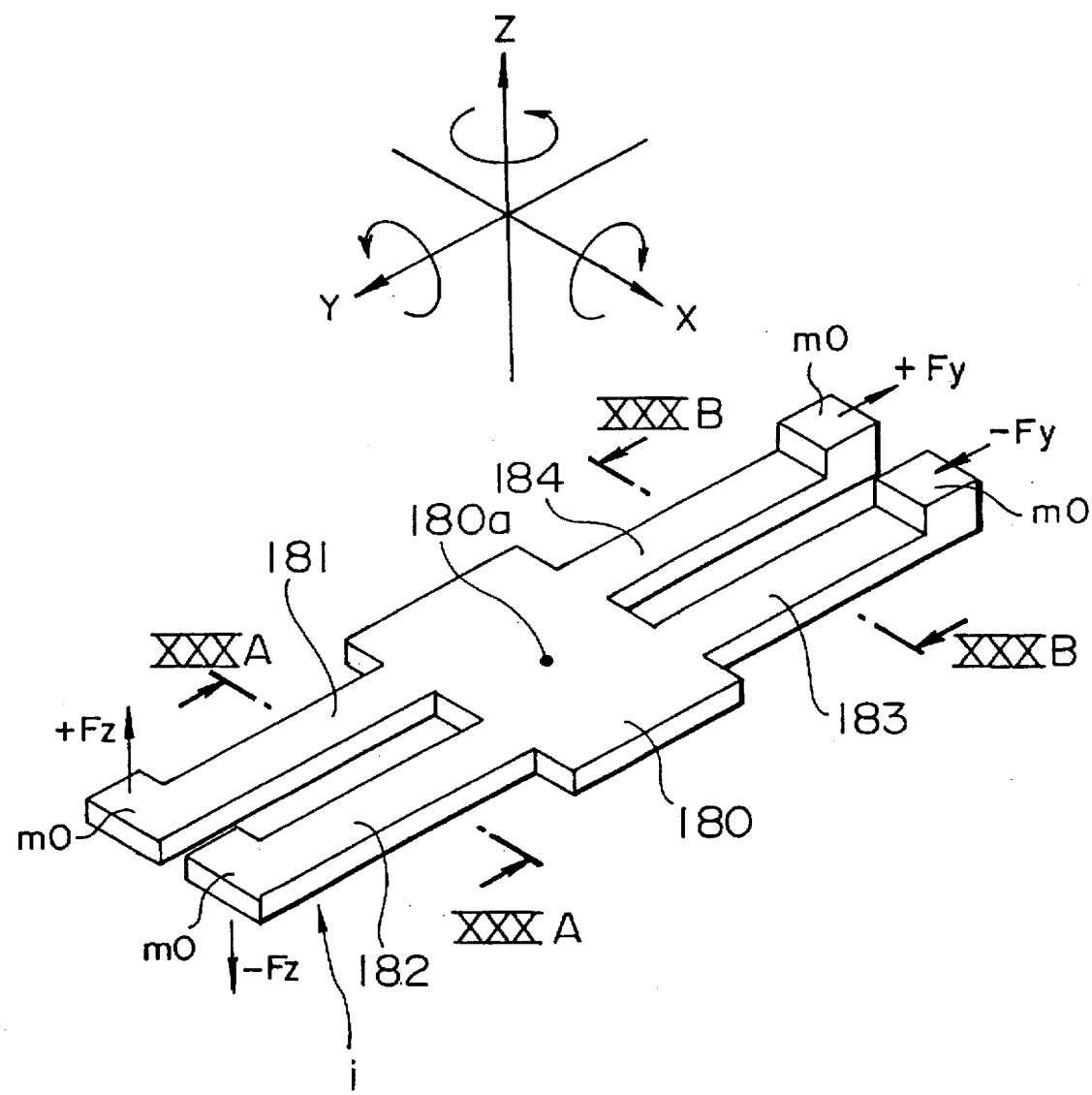
FIG. 28 is a perspective view showing the vibratory gyroscope according to a ninth example of the present invention.

In order to detect the respective components of all Coriolis forces in the rotating systems about the three axes, two sets of vibrators are required. In the case where two sets of vibrators are provided as shown in FIG. 28, the vibrators of a first set (i) and vibrators of a second set (ii) have added masses disposed in different directions. For example, the vibrators of the first set (i) have the added masses deviated in the X direction, whereas the vibrators of the second set (ii) have the added masses deviated in the Z direction. The vibrators are respectively driven in the same directions as the directions in which the added masses are deviated. The vibrations of the vibrators of the first set in the X direction enable the rotational component about the Z-axis to be detected. The vibrations of the vibrators of the second set in the Z direction enable the rotational component about the X axis to be detected. If rotations about the Y-axis, which is the direction of the major axis of the vibrator, are given, the vibrators in the first set (i) and those in the second set (ii) are vibrated in the Z direction. Thus, by detecting vibrations of the vibrators in at least one set in a direction perpendicular to the drive direction, the rotational component about Y-axis can be detected.

Figure 19:
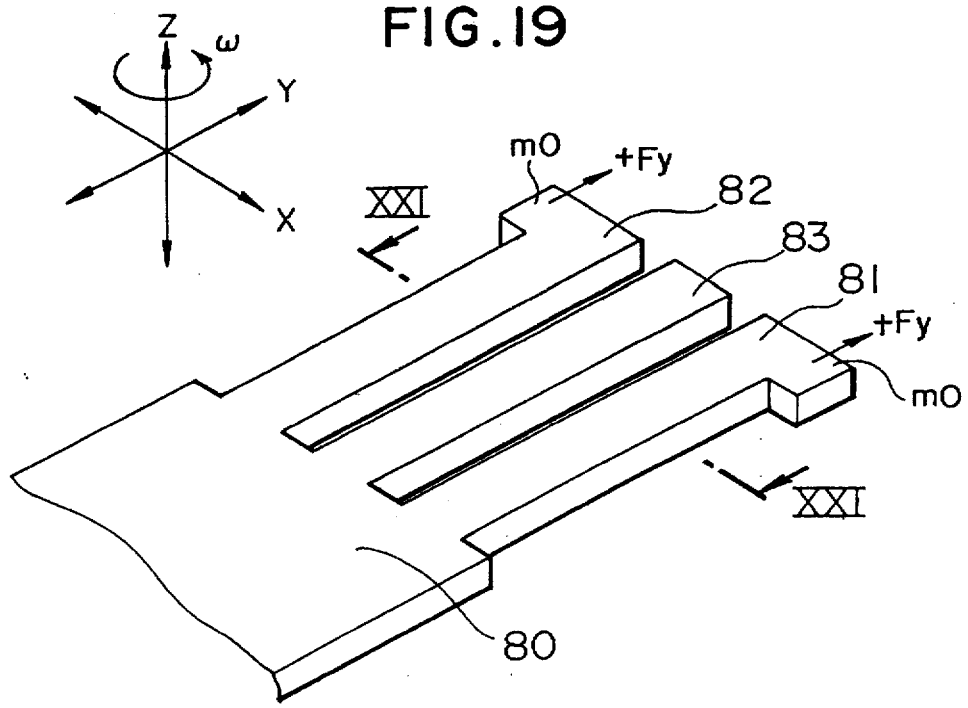
FIG. 19 is a perspective view showing a vibratory gyroscope according to a sixth example of the present invention.
Figure 22:
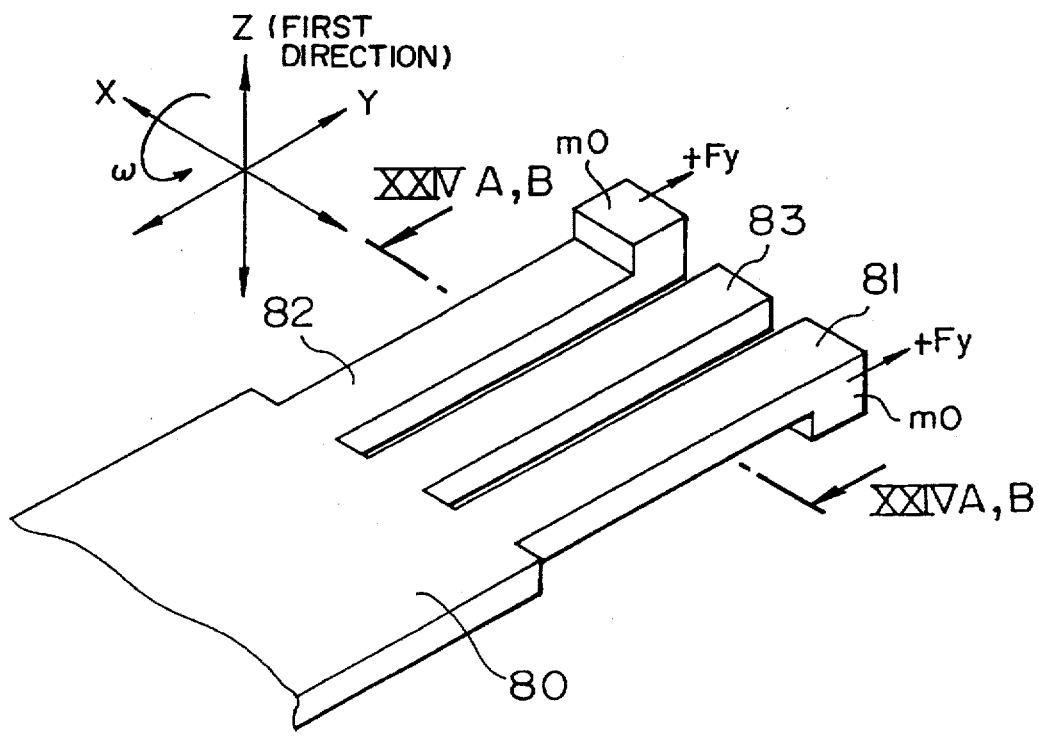
FIG. 22 is a perspective view showing a vibratory gyroscope according to a seventh example of the present invention.

In the case where two sets of vibrators are provided, either set comprises three vibrators as shown in FIG. 19 and a residual set comprises three vibrators as shown in FIG. 22 so that the rotational component about the three axes are detected.

If the vibrator is made of a single crystal material, the temperature coefficient of the frequency (change in the frequency due to change in the temperature) can be made substantially zero. Thus, influence of change in the temperature upon the accuracy in detection can be eliminated satisfactorily.

Figure 31A:
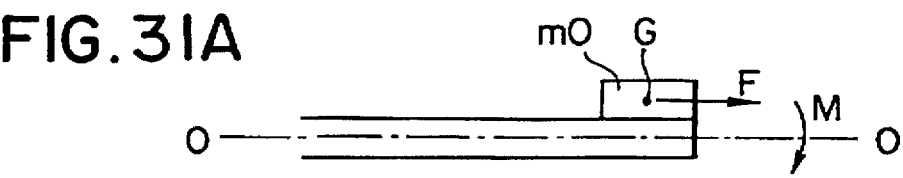
FIGS. 31A, 31B and 31C are side views showing the shape and structure of the added masses according to each example.
Figure 31B:
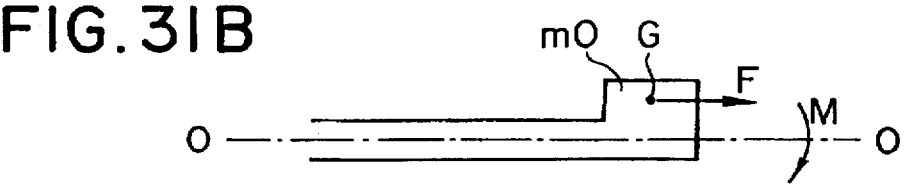
Figure 31C:
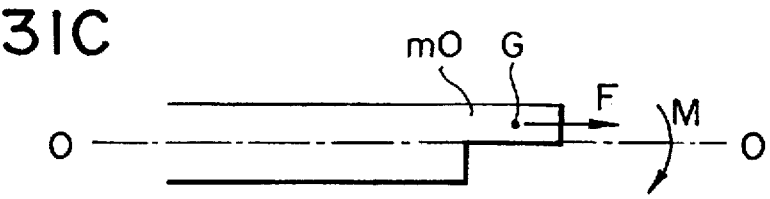

The added mass mO provided for the vibrator may be formed by bonding an individual member to a leading portion of the vibrator, as shown in FIG. 31A. As a result, the center of gravity G can be deviated with respect to central axis O—O of the vibrator (a neutral axis of the vibrator alone, that is, without considering the added mass). The added mass mO may be formed integrally with the leading portion of the vibrator by causing the same to project or by bending the same, as shown in FIG. 31B. As an alternative to this, a cut portion may be formed in the leading portion of the vibrator as shown in FIG. 31C to form the residual portion to serve as the added mass mO. Also in the foregoing case, the center of gravity G is, in the leading portion of the vibrator, deviated from the central axis O—O of the vibrator.

Embodiments of the present invention will now be described with reference to the drawings.

First Embodiment

Figure 2A:
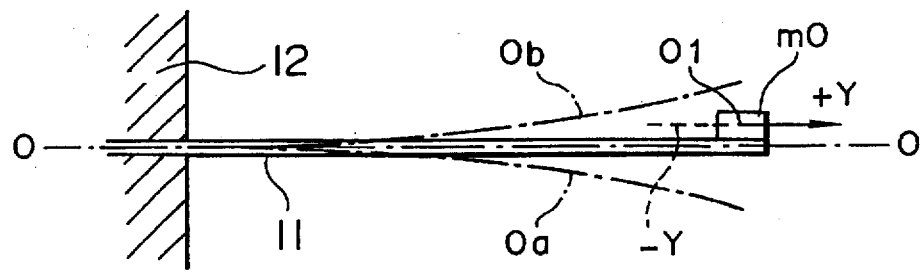
FIG. 2A is a side view showing a state where the vibratory gyroscope according to the first example is bending-vibrated in a primary resonance mode.
Figure 2B:
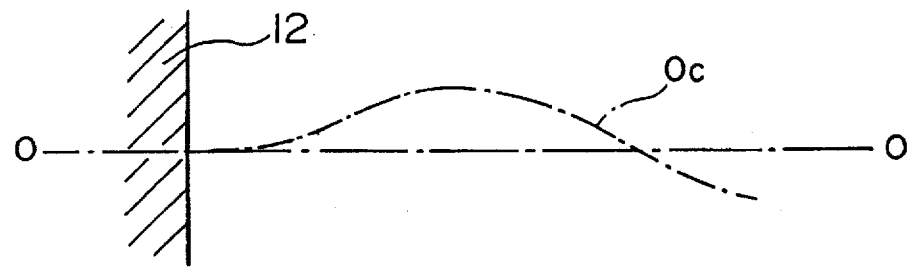
FIG. 2B is a view of explanatory showing a state where the vibratory gyroscope is bending-vibrated in a secondary resonance mode.
Figure 3:
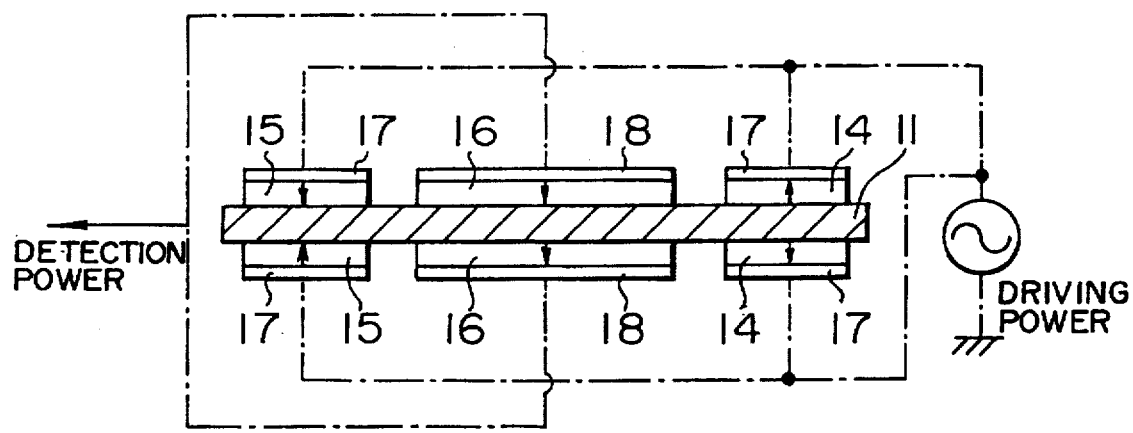
FIG. 3 is an enlarged cross sectional view taken along line III—III of FIG. 1 and showing the structure of the piezoelectric device provided for the vibrator.

FIG. 1 is a perspective view showing a vibratory gyroscope according to a first embodiment of the present invention. FIG. 2A is a side view showing the operation in a vibration mode in which the vibratory gyroscope shown in FIG. 1 is vibrated due to the Coriolis force. FIG. 2B is a view of explanatory showing a state where the vibratory gyroscope is bending vibrated in a secondary resonance mode, and FIG. 3 is an enlarged cross sectional view taken along line III—III of FIG. 1 showing the structure of the piezoelectric devices mounted on the vibratory gyroscope of the first embodiment.

The vibratory gyroscope shown in FIG. 1 includes a single flat vibrator 11 rigidly connected at a first end to a support member 12 such that the vibrator 11 is supported using a cantilever method (a rigid support method). The vibrator 11 is made of an isoelastic metal (Elinvar). The isoelastic metal (Elinvar) is a material in which the Young's modulus is not substantially changed in response to temperature changes in a range approximately equal to room temperature. The isoelastic metal (Elinvar) is an alloy consisting of Fe (iron), Ni (nickel), Cr (chrome) and Ti (titanium) or an alloy further comprising Co (Cobalt).

An added mass (protrusion) mO is disposed on the upper side surface along the leading (free) edge of the vibrator 11 and protrudes from the vibrator 11 (alternatively, the added mass mO may be disposed on the lower side surface of the vibrator 11). The added mass mO may be separately formed and secured to the vibrator 11 using, for example, an adhesive. In this case, the added mass mO may be formed from a metal having a larger density than that of the isoelastic material of the vibrator 11. Alternatively, the added mass mO and the vibrator 11 may be formed integrally.

FIGS. 1 and 2 show a central (longitudinal) axis O of the vibrator 11. The central axis O is a line passing through the center of gravity of the vibrator 11 and extends in the Y-axis direction. The central axis O is a neutral axis of the vibrator 11 during deflection (vibration). In this embodiment, an assumption is made that the Coriolis force acts in the Y direction, that is, parallel to the central axis O. Therefore, the added mass mO disposed on either (upper or lower) side surface of the leading portion of the vibrator 11 causes application point O1 of the Coriolis force to be located above the central axis O (as shown in FIG. 2), or below the central axis O (when the added mass is located on the lower side surface). Because the application point O1 is displaced from the central (neutral) axis O, the Coriolis force produces a bending moment at the free end of the vibrator 11, thereby causing the free end, of the vibrator 11 to vibrate in the Z-direction (i.e., in the Y-Z plane, as shown in FIG. 2A).

As shown in FIG. 1, piezoelectric devices 14 and 15 serving as drive means are secured along opposite side edges of the vibrator 11 and extend in the Y-axis direction. As shown in FIG. 3, the piezoelectric devices 14 and 15 are disposed symmetrically on the upper and lower surfaces of the vibrator 11. A driving electrode layer 17 is formed on each surface of the piezoelectric devices 14 and 15 on the upper and lower sides of the vibrator 11. The electrode layers 17 and the vibrator 11 supply AC voltage to each of the piezoelectric devices 14 and 15 in the thickness direction of the vibrator 11 (in the Z direction).

As shown in FIG. 3, a piezoelectric device 16 serving as a detector is symmetrically secured on a central portion of the upper and lower surfaces of the vibrator 11. A detection electrode layer 18 is formed on each surface of the piezoelectric devices 16 which is used to detect the potential difference across the piezoelectric devices 16, measured in the thickness direction of the vibrator 11 (in the Z direction), which is generated due to dielectric polarization of the piezoelectric devices 16.

For purposes of explaining the directions of dielectric polarization (indicated by the arrows in FIG. 3), the piezoelectric devices 14, 15 and 16 are shown in FIG. 3 as being thicker than their actual thickness.

The drive means include a structure such that the polarizing directions of the piezoelectric devices 14 disposed on the upper and lower side surfaces of the vibrator 11 oppose each other in the Z direction. Likewise, the piezoelectric devices 15 disposed on the upper and lower side surfaces of the vibrator 11 have opposite polarizing directions, which are opposite in direction to the polarizing directions of the piezoelectric devices 14. The piezoelectric devices 16 disposed on the upper and lower surfaces of the vibrator 11 have the same polarizing direction (for example, as shown in FIG. 3, the polarizing direction is in the -Z direction). The vibrator 11 is electrically grounded, thereby serving as an opposite electrode with respect to each of the electrode layers 17 and 18.

The operation of the vibratory gyroscope according to the first embodiment will now be described.

AC voltage having a predetermined frequency is applied from a drive circuit to the electrode layers 17 of the piezoelectric devices 14 and 15 disposed on the upper and lower side surfaces of the vibrator 11. In the case in which the polarizing directions of the piezoelectric devices 14 and 15 are as shown in FIG. 3, an AC voltage having the same phase is applied to the electrode layers 17 on the both surfaces of the piezoelectric devices 14 and 15.

When the piezoelectric devices 14 and 15 are applied with the foregoing AC voltage, contraction and expansion of the piezoelectric devices 14 and 15 cause the free end of the vibrator 11 to be vibrated (deformed) in the X direction (in the X-Y plane). If the vibrator 11 is subsequently rotated about the Z-axis, Coriolis force acts on the vibrator 11 and added mass mO in the Y direction (that is, perpendicular to the X direction). Because the added mass mO is displaced (above) the central axis O, the Coriolis force is applied at point Oh of the added mass mO, which is deviated from the central axis O. The resulting moment produced by the Coriolis force causes the free end of the vibrator 11 to be bent (vibrated) in the Z direction (in the Y-Z plane).

If, at a certain moment, the piezoelectric device 14 exhibits expanding force in the Y direction and the piezoelectric device 15 exhibits compressive force in the Y direction (as shown in FIG. 1), the direction of the drive deformation of the vibrator 11 is made to be in the +X direction. If the direction of the drive deformation of the vibrator 11 is in the +X direction and the vibrator is rotated about the Z-axis, Coriolis force acts in the +Y direction. As a result, the vibrator 11 is bending-deformed in a direction indicated by Oa shown in FIG. 2A. If the piezoelectric device 14 exhibits the compressive force in the Y direction and the piezoelectric device 15 exhibits the expansion force in the Y direction, the direction of the resulting drive deformation of the vibrator 11 is in the −X direction. In the foregoing case, the Coriolis force acts in the −Y direction, and thus the vibrator 11 is deformed in a direction indicated by Ob shown in FIG. 2A.

The bending vibration of the vibrator 11 in the Z direction is detected by the piezoelectric devices 16 disposed on the two sides of the vibrator 11. When the vibrator 11 is, by the Coriolis force, bent in the +Z direction, the piezoelectric device 16 disposed on the lower surface of the vibrator 11 is stretched (expanded) in the Z direction, in a certain vibration phase. On other hand, the piezoelectric device 16 on the upper surface of the vibrator 11 is compressed in the Z direction. In the case where the polarizing direction of the piezoelectric device 16 is as shown in FIG. 3, AC voltages having the same phase can be obtained at the piezoelectric devices 16 disposed on the two sides of the vibrator 11 and the detection electrode layer 18. By adding the voltages from the electrode layers of the piezoelectric devices respectively disposed on the two sides of the vibrator 11, AC voltage corresponding to the bending vibration of the vibrator 11 in the Z direction can be obtained. In accordance with the thus-obtained AC voltage, the angular velocity ω about the Z-axis can be determined.

When the Coriolis force acts on the application point O1 and thus the vibrator 11 is bending-vibrated in the Z direction, there arises the following three cases: the vibrator 11 is bent/vibrated in a primary resonance mode as indicated by Oa and Ob shown in FIG. 2A, the vibrator 11 is bent/vibrated in a secondary resonance mode as indicated by Oc shown in FIG. 2B, and the vibrator 11 is vibrated in a higher resonance mode. When the vibrator 11 is driven in the X direction, the vibrator 11 is vibrated in the primary resonance mode. Although the bending vibration mode of the vibrator 11 in the Z direction is affected by the frequency of the resonant vibration of the vibrator 11 in the X direction, the bending vibration in the Z direction is usually the secondary resonance mode shown in FIG. 2B in the case where the vibrator 11 is driven in the resonance mode in the X direction.

Figure 4:
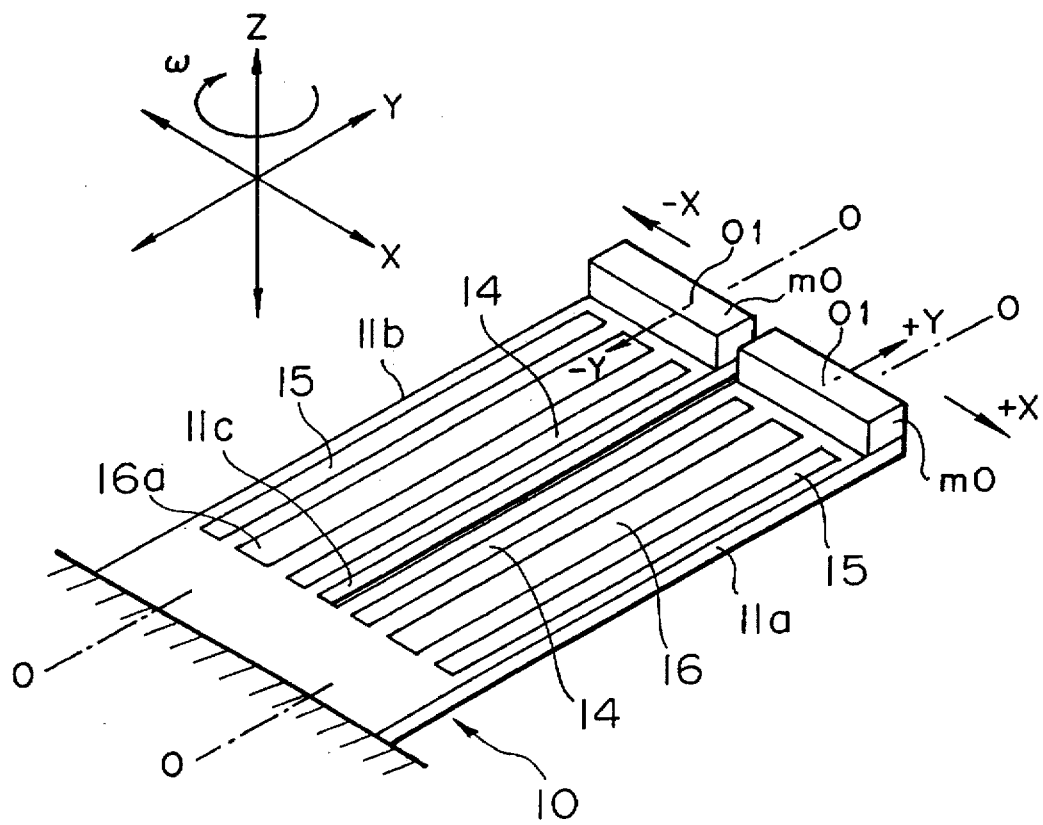
FIG. 4 is a perspective view showing a vibratory gyroscope according to a modification of the first example.

FIG. 4 shows a modification of the vibratory gyroscope according to the first embodiment shown in FIG. 1.

The vibratory gyroscope shown in FIG. 4 includes a flat member 10 made of isoelastic metal (Elinvar) in which a groove 11c is formed by cutting the leading portion of the flat member 10. Thus, two flat, parallel vibrators 11a and 11b separated from each other by the groove 11c are formed. The two vibrators 11a and 11b have the same shape and dimensions. Furthermore, each of the vibrators 11a and 11b includes an added mass mO on either side in the leading portion (free end) thereof by means of adhesion or the like.

Similar drive means and detection means to those of the vibrator 11 shown in FIG. 1 are provided for the vibrators 11a and 11b. Each of the vibrators 11a and 11b has piezoelectric devices 14 and 15. Note that the piezoelectric devices 14 and 15 of the vibrators 11a and 11b are disposed at different positions from those of the vibrator 11 shown in FIG. 1. Each of the vibrators 11a and 11b has the piezoelectric devices 14 on the two sides thereof at positions near the groove 11c. On the other hand, piezoelectric devices 15 are secured at ends of the two sides of the flat member 10, the ends opposing the groove 11c. The dielectric polarization directions of the piezoelectric devices 14 and 15 shown in FIG. 4 are the same as those shown in FIG. 3.

In the central portion of the two sides of the vibrator 11a, there is secured piezoelectric devices 16 serving as detection means. The dielectric polarization direction of the piezoelectric devices 16 is the same as that of the piezoelectric device 16 shown in FIG. 1. Similarly, the vibrator 11b has piezoelectric devices 16a on the opposing sides thereof to serve as detection means. The dielectric polarization direction of the piezoelectric devices 16a disposed on the two sides of the vibrator 11b opposes that of the piezoelectric devices 16 shown in FIG. 3. That is, the polarizing directions of both of the piezoelectric devices 16a disposed on the two sides of the vibrator 11b commonly are in the +Z direction.

In the vibratory gyroscope shown in FIG. 4, the vibrators 11a and 11b are, by the piezoelectric devices 14 and 15 serving as the drive means, deformation-vibrated in the X direction. Since the positions of the piezoelectric devices 14 and 15 of the vibrators 11a and 11b oppose each other in the X direction, the vibrators 11a and 11b vibrate in opposite phases. For example, if the direction of amplitude of the vibrator 11a is in the +X direction in a certain phase, the direction of amplitude of the vibrator 11 is in the −X direction.

When the flat member 10 is placed in a rotating system which is rotated about the Z-axis, Coriolis force in the Y direction acts on the flat member 10. Since the phases of the vibration deformation in the X direction are opposite to each other between the vibrators 11a and 11b, the phase of the Coriolis forces acting on the vibrator 11a and that acting on the vibrator 11b also oppose each other. If the direction of amplitude of the vibrator 11a is in the +X direction and the direction of amplitude of the vibrator 11b is in the −X direction, the Coriolis force acting on the vibrator 11a is in the +Y direction and that acting on the vibrator 11b is in the −Y direction.

Figure 5:
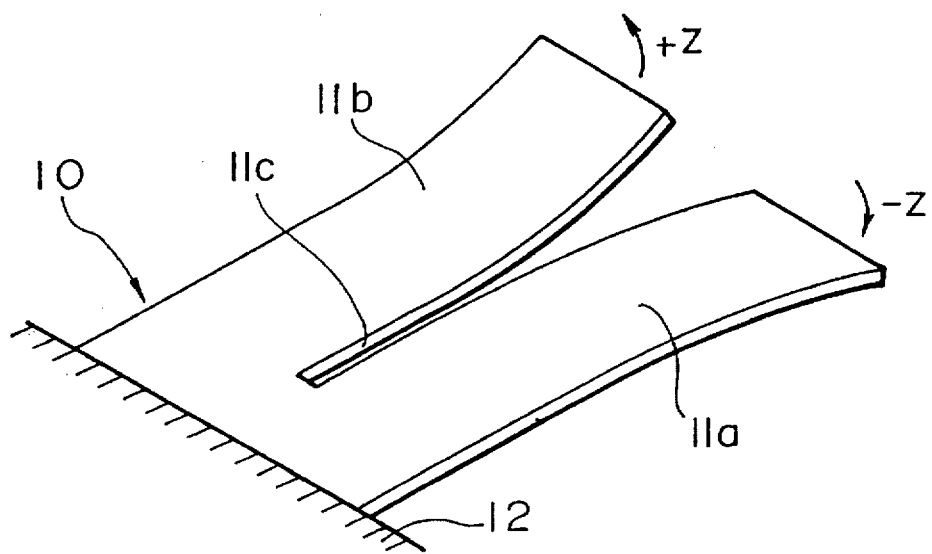
FIG. 5 is a perspective view showing a bending-vibration mode of the vibrator shown in FIG. 4.

Since the added mass mO is secured to each of the leading portions of the vibrators 11a and 11b, the Coriolis force acts on the application point O1 which is deviated to the upper side of the drawing with respect to the central axis O of each of the vibrators 11a and 11b. As a result, the vibrator 11a, on which the Coriolis force in the +Y direction acts, is bent/deformed in the −Z direction, as shown in FIG. 5. On the other hand, the vibrator 11b, on which the Coriolis force in the −Y direction acts, is bending-deformed in the +Z direction. Thus, the two vibrators 11a and 11b alternately vibrate in the Z direction in such a manner that the phases of the vibrations are opposite to each other.

The bending vibrations are detected by the piezoelectric devices 16 and 16a provided for the corresponding vibrators 11a and 11b. Although the vibrators 11a and 11b bending-vibrate in the Z direction in the opposite phases, the fact that the polarizing directions of the piezoelectric devices 16 and 16a are opposite to each other enables the same-phase voltage to be obtained from the detection electrode layers 18 of the two piezoelectric devices 16 and 16a. By adding the thus-obtained voltages, the angular velocity ω about the Z-axis can be detected.

The vibratory gyroscope shown in FIG. 4 may have a structure such that either of the added masses mO is disposed in the upper portion of the drawing sheet in the leading portion of the vibrator 11a and the added mass mO is disposed in the lower portion of the drawing sheet in the leading portion of the vibrator 11b. In the foregoing case, the two vibrators 11a and 11b are deformation-vibrated in the X direction in the same phase. That is, the vibrators 11a and 11b are driven in such a manner that both of the directions of amplitude of the vibrators 11a and 11b are in the +X direction or the −X direction at a certain moment. In the foregoing case, Coriolis forces in the same phase acts on the two vibrators 11a and 11b in the Y direction. Both of the Coriolis forces acting on the vibrators 11a and 11b at a certain moment are in the +Y direction or the −Y direction.

However, the structure, when the added masses mO provided for the vibrators 11a and 11b are disposed to oppose each other with respect to the central axis O, the vibrators 11a and 11b are respectively bending-vibrated in the −Z direction and the +Z direction in opposite phases. As a result, the same vibration mode as that shown in FIG. 5 is realized. Therefore, the piezoelectric devices 16 and 16a serving as the detection means are able to detect the bending vibration components, similar to the structure shown in FIG. 4.

The modification shown in FIG. 4 is usually structured such that the vibrations of the vibrators 11a and 11b in the X direction are in the primary resonance mode and those in the Z direction are in the secondary resonance mode shown in FIG. 2B.

Figure 6:
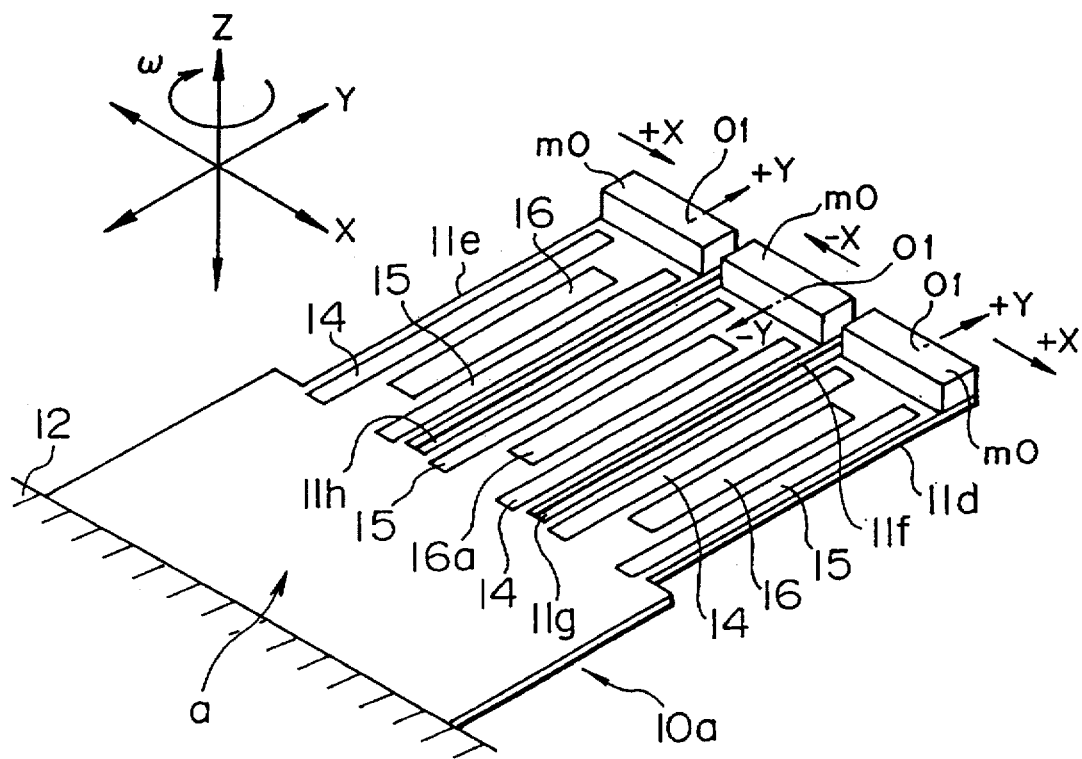
FIG. 6 is a perspective view showing a vibratory gyroscope according to another modification of the first example.

FIG. 6 shows another modification of the first embodiment. The vibratory gyroscope shown in FIG. 6 comprises a flat plate 10a made of isoelastic metal (Elinvar) and having two parallel grooves 11g and 11h formed by cutting the flat plate 10a from its leading portions. Thus, three flat vibrators 11d, 11e and 11f separated from one another by the groves 11g and 11h are produced. The vibrators 11d, 11e and 11f have the same shape and dimensions. Note that the central 11e have different widthwise directions in the X direction. The vibrators 11d, 11e and 11f have, on the same sides, corresponding added masses mO in their leading portions.

On the two sides of the right and left vibrators 11d and 11e, there are disposed piezoelectric devices 14 and 15 serving as the drive means. Furthermore, piezoelectric devices 16 serving as the detection means are secured to the central portions of the two sides of the vibrators 11d and 11e. The configuration of the piezoelectric devices 14, 15 and 16 is the same as those provided for the vibrator 11 shown in FIG. 1 and as those provided for either of the vibrator 11a shown in FIG. 4. That is, the polarizing direction of the piezoelectric devices 14, 15 and 16 provided for the vibrators 11d and 11e is the same as those of the structure shown in FIG. 3.

On the two sides of the vibrator 11f, which is disposed in the central portion of the flat plate 10a, there are disposed piezoelectric devices 14 and 15 serving as the drive means in such a manner that the X-directional configuration opposes the configuration in the vibrators 11d and 11e. That is, the piezoelectric devices 14 are secured on the two sides near the groove 11g and the piezoelectric devices 15 are secured to the two sides near the groove 11h. Furthermore, piezoelectric devices 16a serving as the detection means are secured to the two sides of the vibrator 11f. That is, the configuration of the piezoelectric devices 14, 15 and 16a provided for the central vibrator 11f is the same as those provided for the other vibrator 11b shown in FIG. 4.

When the electrode layers 17 of the piezoelectric devices 14 and 15 of the vibratory gyroscope shown in FIG. 6 are applied with AC voltages, the vibrators 11d, 11e and 11f are deformed/vibrated in the X direction in the flat plate 10a. The configuration of the driving piezoelectric devices 14 and 15 in each of the vibrators 11d, 11e and 11f causes the right and left vibrators 11d and 11e to be deformation-vibrated in the X direction in the same phase. On the other hand, the central vibrator 11f is deformation-vibrated in the X direction in the opposite phase. If the amplitudes of the right and left vibrators 11d and 11e are in the +X direction, the amplitude of the central vibrator 11f is in the −X direction.

When the flat plate 10a is placed in a rotating system about the Z-axis, Coriolis forces in the same direction, that is, in the Y direction, act on the right and left vibrators 11d and 11e. On the other hand, Coriolis force in the opposite direction acts on the central vibrator 11f. If the right and left vibrators 11d and 11e are deformed in the +X direction and the central vibrator 11f is deformed in the −X direction at a certain moment, as shown in FIG. 6, the Coriolis forces act on the right and left vibrators 11d and 11e in the +Y direction and it acts on the central vibrator 11f in the −Y direction.

Figure 7:
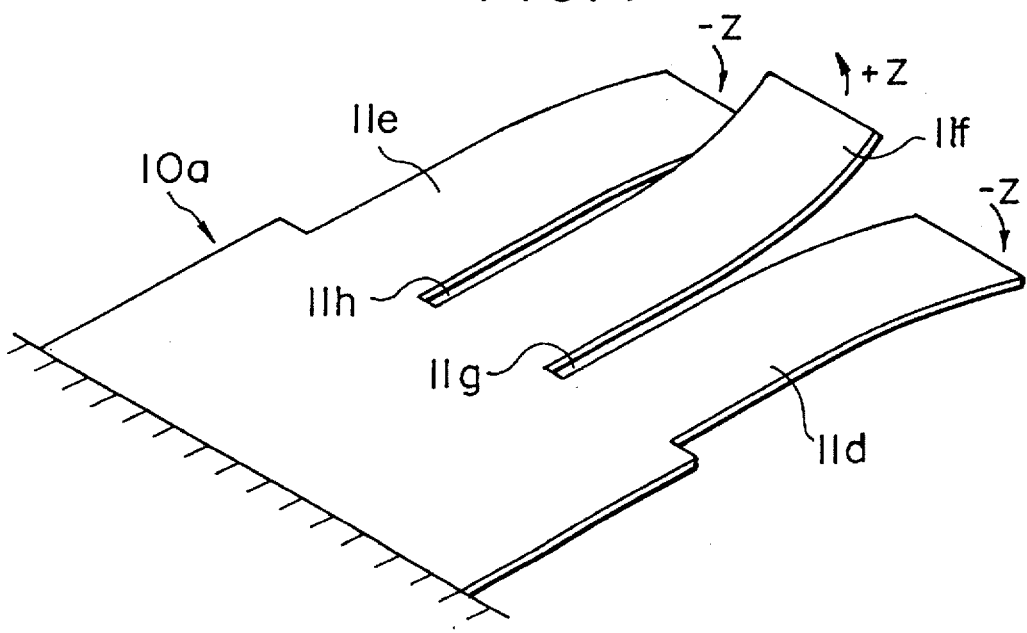
FIG. 7 is a perspective view showing a bending-vibration mode of the vibrator shown in FIG. 6.

Since the added mass mO is disposed in each of the leading portions of the vibrators 11d, 11e and 11f, the Coriolis force acts on each of the application points 01 which are, as shown on the drawing sheet, deviated upwards with respect to the central axis O of each of the vibrators 11d, 11e and 11f. The moment generated due to the Coriolis force that acts as described above causes the right and left vibrators 11d and 11e and the central vibrator 11f to deformation-vibrate in the Z direction in the opposite phases. As shown in FIG. 7, in a certain phase, both of the amplitudes of the bending vibrations of the right and left vibrators 11d and 11e are in the −Z direction, and the amplitude of the bending vibrations of the central vibrator 11f is in the +Z direction. That is, the Coriolis force Causes the vibrators 11d and 11e to bending-vibrate in the same direction, that is, in the Z direction, and the central vibrator 11f to bending-vibrate in the alternate phases to the phases of the bending vibrations of the vibrators 11d and 11e. The bending-vibrations in the Z direction are in the primary resonance mode shown in FIG. 2A, in the secondary resonance mode shown in FIG. 2B, or in a higher vibration mode.

Since the detection piezoelectric devices 16 are disposed on the two sides of the right and left vibrators 11d and 11e and the detection piezoelectric devices 16a are disposed on the two sides of the central vibrator 11f, addition of the detected voltages obtained from the electrode layers 18 on the surfaces of the piezoelectric devices 16 and 16a enables the angular velocity ω about the Z-axis to be detected.

The flat plate 10a shown in FIG. 6 may have a structure such that added masses mO are disposed on the upper surfaces in the leading portions of the right and left vibrators 11d and 11e and added mass mO is, in the leading portion Of the central vibrator 11f, disposed in the lower surface that opposes the foregoing upper surface.

In the foregoing case, the X-directional configuration of the piezoelectric devices 14 and 15 serving as the drive means is made to be commonly for all vibrators 11d, 11e and 11f. In this case, the piezoelectric devices 14 and 15 serving as the drive means cause all vibrators 11d, 11e and 11f to be deformation-vibrated in the X direction in the same phase.

That is, the X-directional amplitudes of all vibrators 11d, 11e and 11f are in the +X direction or the -X direction at a certain moment.

In the foregoing case, the Coriolis forces generated due to the rotating system about the Z-axis act on all vibrators 11d,11e and 11f in the same direction. That is, the Coriolis forces act on all vibrators 11d, 11e and 11f in the +Y direction or the -Y direction. Since the added mass mO of the central vibrator 11f and the added masses mO of the right and left vibrators 11d and 11e are disposed on the opposite two sides, the Coriolis forces in the same direction cause the right and left vibrators 11d and 11e to be bending-vibrated in the Z direction in the same phase. On the other hand, the central vibrator 11f is caused to be bending-vibrated in the Z direction in the opposite phase. Thus, the vibration mode that is the same as that shown in FIG. 7 can be realized.

Also in the foregoing case, the AC voltages obtained from the electrode layers on the surfaces of the piezoelectric devices 16 and 16a serving as the detection means enable the angular velocity ω to be determined.

Since the vibratory gyroscope shown in FIG. 6 is able to detect the bending vibrations generated due to the Coriolis forces from the three vibrators 11d, 11e and 11f, the level of detection output can be raised.

Since the right and left vibrators 11d and 11e and the central vibrator 11f are, in the vibratory gyroscope shown in FIG. 6, bending-deformed in the Z direction in the alternate phases, the quantity of deformation of a base portion (portion a) of the flat plate 10a, in which the grooves 11g and 11h are not formed, is very small. Thus, the flat plate 10a can be supported in a rigid manner such that the flat plate 10a is held from the two sides by the support member 12. That is, even if the flat plate 10a is supported in the rigid manner, the vibration mode shown in FIG. 7 is not affected. If the length of the central vibrator 11f of the flat plate 10a shown in FIG. 6 is changed, the resonant frequency (specific frequency) of the vibration mode shown in FIG. 7 can be adjusted. Thus, the operation for adjusting the frequency can be performed very easily.

Each of the vibratory gyroscopes respectively shown in FIGS. 1, 4 and 6 is able to detect the angular velocity about the axis in the direction (the Z direction) perpendicular to the surface (which lies in the X-Y plane) of the flat-shape vibrator.

Therefore, by mounting any of the vibratory gyroscopes in such a manner that its surface runs parallel to a substrate, the angular velocity in a rotating system that is in parallel to the substrate can be detected.

By employing another vibratory gyroscope for detecting the angular velocity of a rotating system about the Y-axis, the rotational component in each of the two or three dimensional directions can be detected.

For example, each added mass mO is omitted from a vibratory gyroscope comprising the flat plate 10a shown in FIG. 6. In the foregoing gyroscope, the right and left vibrators 11d and 11e and the central vibrator 11f similarly to the gyroscope shown in FIG. 6, vibrated in the direction of the surface of the flat plate 10a (the X direction) in the opposite phases. If the foregoing gyroscope is placed in a rotating system about the Y-axis, the Coriolis forces causes the vibrators 11d, 11e and 11f to be bending-vibrated in the Z direction. The bending vibration modes of the vibrators 11d, 11e and 11f are the same as those shown in FIG. 7. By detecting the bending vibrations, the angular velocity about the Y-axis can be detected.

Therefore, a thin detection apparatus for detecting angular velocities around two axes may be produced using the vibratory gyroscope shown in FIG. 6 and a modified version of the vibratory gyroscope shown in FIG. 6 (having no added mass mO) by mounting the two vibratory gyroscopes on a substrate in such a manner that their surfaces are in parallel to the substrate. The thus-formed detection apparatus is able to detect the angular velocities about the Z-axis and the Y-axis, and as well as able to detect the rotation in each of the two-dimensional directions. Since the surface of the flat vibrator of either vibrator is in parallel to the substrate, a thin detection apparatus can be realized.

Second Embodiment

Figure 8:
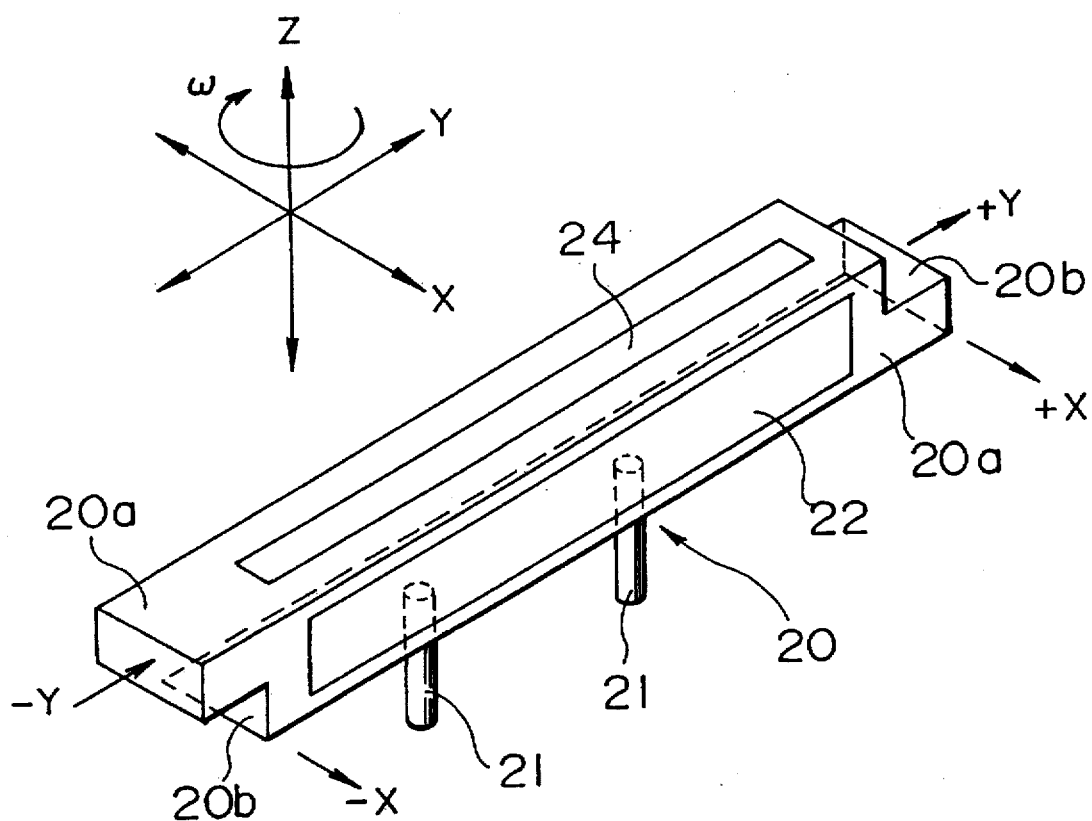
FIG. 8 is a perspective view showing a vibratory gyroscope according to a second example of the present invention.
Figure 9A:
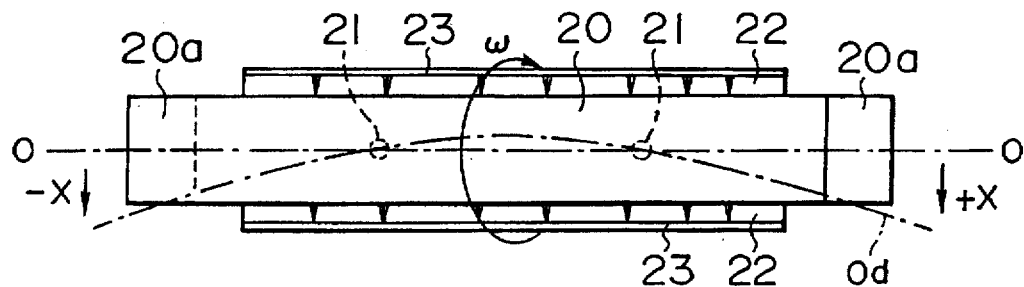
FIG. 9A is a plan view showing the vibratory gyroscope shown in FIG. 8.
Figure 9B:
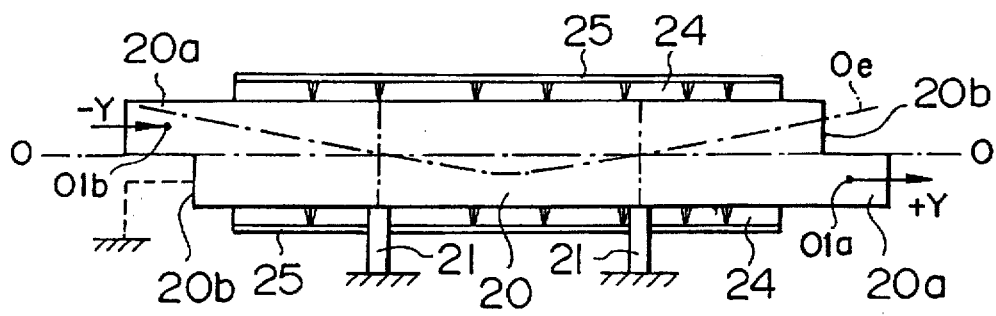
FIG. 9B is a side view showing the foregoing vibratory gyroscope.

FIG. 8 is a perspective view showing a second embodiment of the vibratory gyroscope according to the present invention. FIG. 9, consisting of 9A and 9B, shows the operation of the vibratory gyroscope according to this embodiment, in which FIG. 9B is a plan view and FIG. 9B is a side view.

The vibratory gyroscope according to this embodiment comprises a vibrator 20 having a rectangular (or square) cross sectional shape. The vibrator 20 is formed by isoelastic metal (Elinvar). In FIGS. 9A and B, the central axis (an axis passing through the center of gravity of the rectangular cross section) of the vibrator 20 is indicated by 0.

The vibrator 20 is supported by paired support rods 21 at two points on the central axis O. The support rods 21 are secured at the lower surface of the vibrator 20 at the same distance from the center of the central axis O, the support rods 21 having lower ends that are secured to the substrate or the support plate.

At the two ends of the major axis (the central axis O) of the vibrator 20, there are formed added masses mO. The added masses mO are in the form of cut portions 20b formed by cutting the two ends of the vibrator 20. Since the added masses mO are formed as shown in FIG. 9B, Coriolis forces acting in the Y direction act on the application points 11a and 11b that are deviated with respect to the central axis O.

As shown in FIG. 9A, the vibrator 20 has, on the two sides thereof that oppose the X direction, piezoelectric devices 22 secured thereto to serve as the drive means. In FIG. 9A, the piezoelectric devices 22 are shown to be thicker than their actual thickness in order to indicate their dielectric polarization directions (indicated by arrows). The polarizing directions of the piezoelectric devices 22 are in the same direction (e.g., downward in FIG. 9A). The piezoelectric devices 22 have drive electrode layers 23 on the surfaces thereof.

The vibrator 20 has, on the upper and lower sides thereof that are perpendicular to the Z direction, piezoelectric devices 24 secured thereto to serve as detection means. In FIG. 9B, the piezoelectric devices 24 are shown to be thicker than the actual thickness thereof and their dielectric polarization directions are indicated by arrows. The polarizing directions of the two piezoelectric devices 24 on the upper and lower sides of the vibrator 20 are the same, for example, in the -Z direction. The piezoelectric devices 24 have detection electrode layers 25 on the surfaces thereof.

Note that the vibrator 20 serves as an opposite electrode to the two drive electrode layers 23 and 25, the vibrator 20 being electrically grounded.

The operation of the vibratory gyroscope according to the second embodiment will now be described.

In the vibratory gyroscope according to this embodiment, AC driving voltages are applied to the drive electrode layers 23 of the piezoelectric devices 22. The electrode layers 23 are applied with AC voltages in the same phase, thus resulting in that the vibrator 20 is so driven that it is bending vibrated in the X direction while using, as the nodes, the two support points formed by the support rods 21. FIGS. 9A and 9B show a case where the vibrator 20 is bending-vibrated in the primary resonance mode. As shown in FIG. 9A by the dash-and-dot line Od, the direction of the amplitude of the central axis O at a certain moment is such that the right end when viewed in the drawing is the +X direction and the left end is the −X direction.

When the vibrator 20 is placed in a rotating system about the Z-axis, Coriolis force in the outward direction (the +Y direction) Of the radius of rotation acts on the right end of the vibrator 20 when viewed in the drawing sheet. On the other hand, Coriolis force in the inward direction (the −Y direction) acts on the left end of the vibrator 20 when viewed in the drawing sheet.

Since added masses mO are formed at the two ends of the major axis of the vibrator 20, the Coriolis forces in the +Y direction and the −Y direction act on the application points 01a and 01b which are deviated vertically in the opposite directions with respect to the central axis O. The moments of the Coriolis forces acting on the deviated positions cause the vibrator 20 to be vertically bending-vibrated in the primary resonance mode. FIG. 9B shows, with the dash-and-dot line Oe, the state of deflection of the central axis O at a certain moment.

The vibrations of the vibrator 20 in the mode indicated by line Oe generated due to the Coriolis forces are detected by the piezoelectric devices 24 serving as the detection means. When the vibrator 20 is deformed in the phase indicated by line Oe in the state shown in FIG. 9B, the piezoelectric device 24 on the upper surface is contracted on the Y-axis, and the piezoelectric device 24 on the lower surface is extended on the Y-axis. By adding the voltages generated on the electrode layers 25 of the piezoelectric devices 24 due to the opposing operations of the piezoelectric devices 24, the angular velocity ω about the Z-axis can be determined.

Figure 10A:
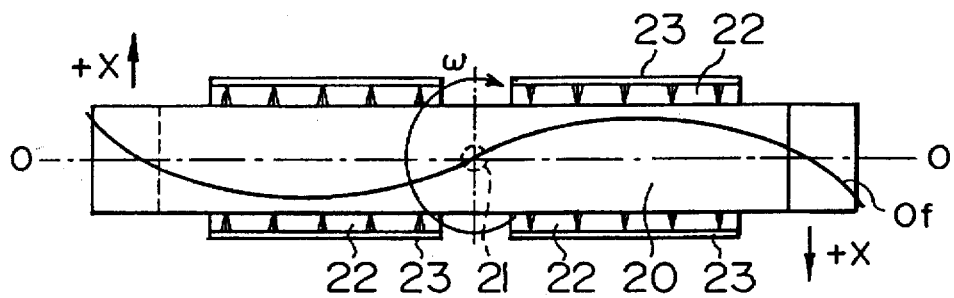
Figure 10B:
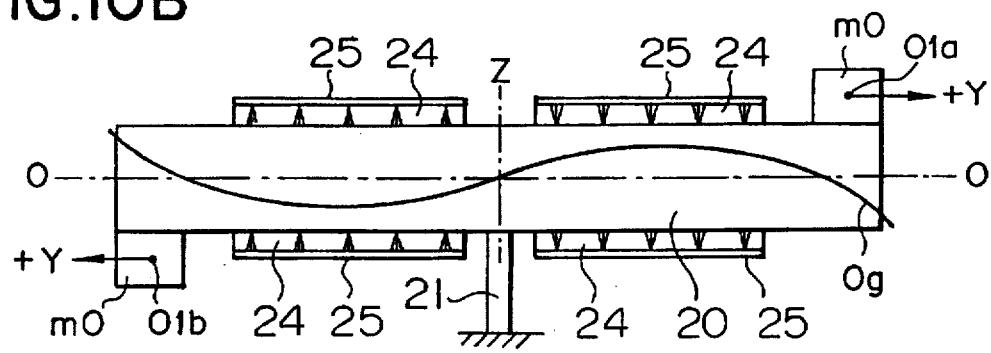

FIGS. 10A and 10B show a state where the vibrator 20 of the vibratory gyroscope similar to that shown in FIG. 8 is vibrated in the secondary resonance mode in the driving direction and the detection direction. FIG. 10A is a plan view, and FIG. 10B is a side view.

The vibrator 20 has individual added masses mO secured thereto at the two vertical ends at the two ends in the major direction (the Y direction) thereof. That is, the added masses may be in the form of the cut portions 20b as shown in FIG. 8 or the same may be formed by securing individual members as shown in FIG. 10.

FIG. 10A shows the piezoelectric devices 22 serving as drive means and driving electrode layers 23, the polarizing directions of the piezoelectric devices 22 secured to the four portions being as indicated by arrows. When AC voltages in the same phase are applied to the electrode layers 23, the vibrator 20 bending-vibrates in the secondary resonance mode in such a manner that its central axis deforms as shown by line of at a certain moment. As a result, Coriolis forces in the same direction in the direction of the radius of rotation acts on the two ends of the vibrator 20.

The added masses mO are secured to the two ends of the vibrator 20 in the major axis thereof so that Coriolis forces acts on the application points 01a and 01b which are deviated in the Z direction with respect to the central axis O. As a result, the central axis O of the vibrator 20, as shown in FIG. 10B, bending-vibrates in the secondary resonance mode as indicated by line Og. The piezoelectric devices 24 serving as the detection means and the electrode layers 25 are shown in FIG. 10B, and the polarizing directions of the piezoelectric devices 24 are as indicated by arrows. The bending vibrations in the mode indicated by line Og shown in FIG. 10B are detected as voltages from the electrode layers 25 so that the angular velocity ω of the rotating system about the Z-axis is obtained.

Third Embodiment

Figure 11:
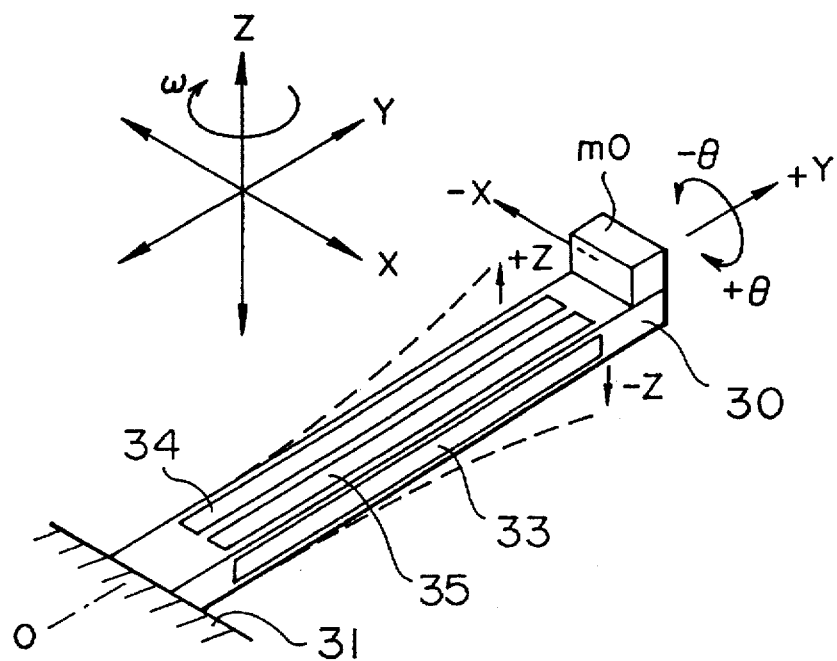
FIG. 11 is a perspective view showing a vibratory gyroscope according to a third example of the present invention.

FIG. 11 shows a third embodiment of the vibratory gyroscope according to the present invention.

In this embodiment, a vibrator 30 includes an isoelastic metal bar having a rectangular cross sectional shape which is supported by a support member 31 in a cantilever method. Furthermore, an added mass mO is secured on the upper surface of the leading portion (free end) of the vibrator 30 (i.e., the added mass protrudes in the Z direction). The added mass mO may be formed by cutting the leading portion of the vibrator 30 as shown in FIG. 8.

The vibrator 30 includes piezoelectric devices 33, which serve as the drive means, which are disposed Opposite sides thereof such that repeated extension and contraction of the vibrator 30 in the Y direction produces vibration of the free end in the Y direction. FIG. 11 shows a state where the vibrator 30 extends in the +Y direction at a certain phase.

When the vibrator 30 is placed in the rotating system about the Z-axis, Coriolis force in the X direction acts on the vibrator 30. Since the added mass mO is disposed in the leading portion of the vibrator 30, the Coriolis force in the X direction acts on the central axis O of the vibrator 30 at a position deviated in the +Z direction. As a result, the vibrator 30 generates torsional vibrations in direction O about the central axis O extending in the Y direction. When the vibrator 30 extends in the +Y direction in a certain phase as shown in FIG. 11, Coriolis force in the −X direction acts on the added mass mO and the vibrator 30 is torsionally deformed in the direction −Θ.

The extending and contracting vibrations of the vibrator 30 in the Y direction causes the vibrator 30 to be alternately torsionally vibrated in the directions of +Θ and −Θ. The foregoing torsional vibrations can be detected as the voltages from the electrode layers of the piezoelectric devices 34 and 35 disposed on the upper and lower surfaces of the vibrator 30 that oppose the Z direction. When the vibrator 30 is torsionally deformed in the direction +e for example, either of the piezoelectric device 34 generates deflection in such a manner that its leading portion faces the +Z direction, while the piezoelectric device 35 generates deflection in such a manner that its leading portion faces the −Z direction. The deflections in the different directions enable the deformation caused from the torsional vibrations of the vibrator 30 to be detected. Thus, the angular velocity ω in a rotating system about the Z-axis can be detected.

Figure 12:
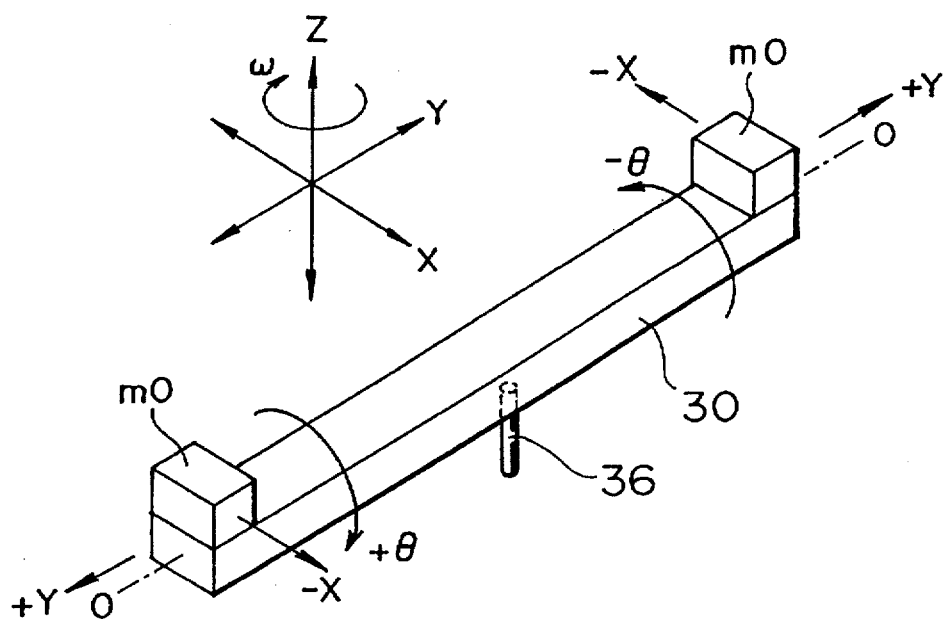
FIG. 12 is a perspective view showing a vibratory gyroscope according to a modification of the third example.

FIG. 12 shows a modification of the third embodiment of the present invention.

In this modification, a support rod 21 is secured to the lower surface at a central position of the major axis of the vibrator 30 having a rectangular cross section so that the central portion of the vibrator 30 is simply supported by the support rod 36. Deviated masses mO are disposed at the two ends of the vibrator 30. The added masses mO are formed by securing individual metal members or the like to the vibrator 30.

The piezoelectric device 33 serving as the drive means similarly to that shown in FIG. 11 vibrates the vibrator 30 in such a manner that the vibrator 30 contracts and extends in the Y direction. When the vibrator 30 is placed in a rotating system about the Z-axis, Coriolis force in the X direction acts on the vibrator 30. Since the added masses mO are disposed, the Coriolis force acts on the central axis O of the vibrator 30 at a position deviated in the Z direction. As a result, the vibrator 30 generates torsional vibrations.

When the vibrator 30 is extends and deformed at a certain moment as shown in FIG. 12 for example, the two ends of the major axis of the vibrator 30 have a velocity component in the +Y direction with respect to the direction of rotation. As a result, an end of the vibrator 30 is torsionally deformed in the −Θ direction and another end of the same is torsionally deformed in the +Θ direction. Thus, the overall body of the vibrator 30 is torsionally vibrates about the central axis O. The torsional vibrations are detected by the piezoelectric devices 34 and 35 serving as detection means similar to those shown in FIG. 11. The vibratory gyroscope using the torsional vibrations shown in FIGS. 11 and 12 may comprise a vibrator having a rectangular, a square cross section or a round-rod vibrator 30 having a circular cross section.

In the second embodiment shown in FIGS. 8 to 10 and the third embodiment shown in FIGS. 11 and 12, the direction of the major axis of the vibrator is in the Y direction to enable the angular velocity about the Z-axis (perpendicular to the direction of the major axis) to be detected. Therefore, if each vibrator is mounted on a substrate in such a manner that the direction of its major axis runs parallel to the substrate, the angular velocity of the rotating system on a plane running parallel to the surface of the substrate can be detected. The conventional structure shown in FIG. 32 is able to detect the angular velocity about the major axis of the vibrator. Therefore, when the vibrator 30 of the vibratory gyroscope according to the second embodiment or the third embodiment is mounted in such a manner that its major axis runs parallel to the surface of the substrate and as well as the conventional vibratory gyroscope shown in FIG. 32 is mounted in such a manner that its direction of the major axis runs parallel to the substrate, a detection apparatus can be formed which has a thin structure and which is capable of detecting both angular velocity on the rotational plane running parallel to the substrate and the angular velocity on the rotational surface perpendicular to the substrate.

In the embodiment shown in FIGS. 8 to 10 and that shown in FIG. 12, the central portion of the vibrator is simply supported by a support rod. The foregoing structure is not suitable to be supported in a rigid manner, contrary to the structure shown in FIG. 6. The structure that the central portion of the vibrator is supported by the support rod is able to significantly simplify the supporting conditions. Furthermore, an advantage can be obtained in that the structure for supporting the vibrator on a substrate or the like can be simplified.

As shown in numerical expression 1, the Coriolis force F is in proportion to the angular velocity A. In each of the foregoing embodiments, the bending vibrations and torsional vibrations of the vibrator generated due to the Coriolis force F can be detected as the AC voltages from the electrode layers of the piezoelectric devices serving as the detection means. In accordance with the AC voltages, the angular velocity ω can be calculated. The principle of the detection is shown in FIG. 33.

Figure 33:
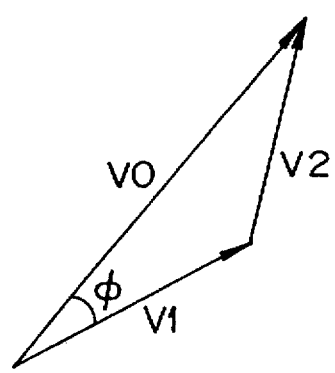
FIG. 33 is a view of explanatory showing the relationship between the detection voltage from the piezoelectric device of the vibratory gyroscope and the Coriolis force.

The voltage obtained from the electrode layer of the piezoelectric device provided for each vibrator and serving as the detection means is indicated by vector V0 shown in FIG. 33. V1 indicates the leak output voltage when the vibrator is not rotated, and the voltage detected in accordance with the Coriolis force, which is in proportion to the angular velocity ω, when the vibrator is rotated, is indicated by V2. Furthermore, φ indicates the phase difference between V0 and V1. That is, by obtaining V2 among the detected voltages obtained from the piezoelectric devices, the angular velocity in the rotating system can be obtained.

In the case where the added masses mO in the form of individual metal members or the like are provided for the vibrators, it is preferable that the weight of the added mass for each vibrator, to which the added mass is secured, be about 10% to about 30% of the vibrator.

If the cut portions 20b are formed at the ends of the vibrator as shown in FIG. 8, it is preferable that the mass to be removed by the cut portions be about 10 to about 30% of the vibrator.

Any of the foregoing embodiments may employ the structure for providing the added mass, in which the individual metal member is secured to the vibrator, or the structure, in which the cut portions are formed. In the case where the flat vibrator is employed, the added mass may be formed by bending the leading portion. If the vibrator is in a columnar shape, the added mass may be formed to project over the upper surface or the lower surface of the vibrator by cutting or by molding in place of forming the cut portions.

Each vibrator according to the embodiments may be made of a piezoelectric material. In the foregoing case, a driving electrode and a detection electrode may arbitrarily be formed on the surface of each of the vibrators.

Fourth Embodiment

Figure 14:
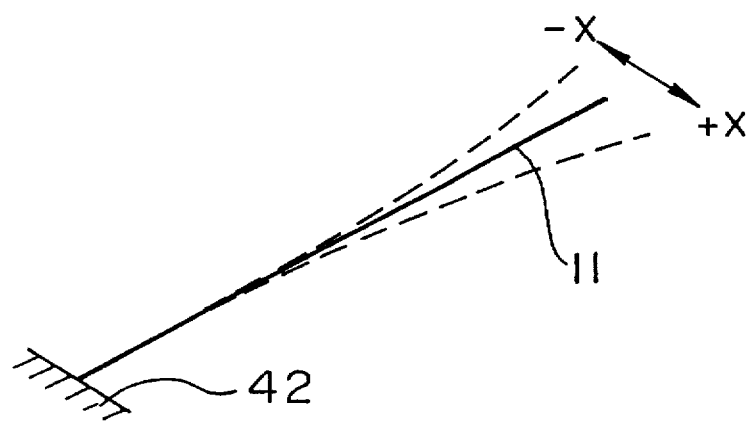
FIG. 14 is a view of explanatory showing a vibration mode of the vibrator according to the fourth example.
Figure 15:
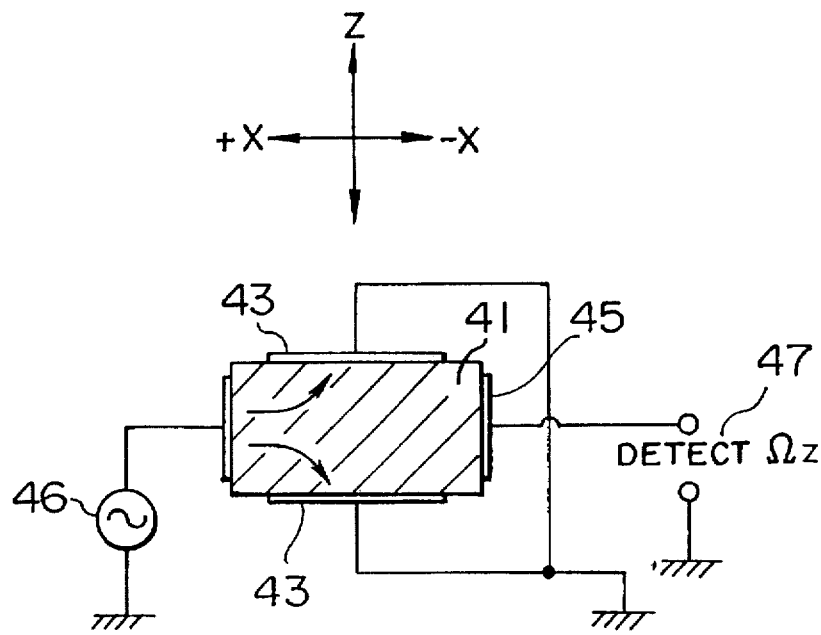
FIG. 15 is a cross sectional view taken along line XV—XV of FIG. 13 and showing the directions of electric fields of crystal forming the vibrator according to the fourth example and the configuration of electrodes of the same.

FIG. 13 shows a fourth embodiment of the present invention. FIG. 14 is a view of explanatory showing the vibration mode of the vibratory gyroscope shown in FIG. 13. FIG. 15 shows the direction of the electric field of the crystal forming the vibrator and the crystal, the crystal orientation of which is realized by a Z-crystal plate at the cut angle rotated +2° about the X-axis, and the configuration of electrodes, FIG. 15 being an enlarged cross sectional view taken along line XV—XV of FIG. 13.

The vibratory gyroscope shown in FIG. 13 comprises a flat vibrator 41 supported by a support member 42 by a cantilever method such that one end of the vibrator 41 is rigidly held by the support member 42. As an alternative to being formed from a flat material, the vibrator 41 may be in a columnar shape. In place of the cantilever method, the support structure may supported be such that the central portion of the vibrator 41 is simply supported.

The vibrator 41 is made of a piezoelectric material. In this embodiment, the piezoelectric material is crystal (a single crystal material), the crystal orientation of which is realized by a Z-crystal plate at a cut angle rotated +2° about the X-axis. The direction of the electric field of the foregoing crystal is as shown in FIG. 15. Alternatively, the vibrator 41 may be made of piezoelectric ceramic. On the upper and lower sides of the vibrator 41 (opposing the Z direction), there are disposed ground electrodes 43 by bonding or stacking. Each of the ground electrodes 43 is connected to a ground potential.

On one of the two side surfaces (opposing the X direction) there is formed a driving electrode 44. On the other side surface, a detection electrode 45 is formed. Each of the electrodes 43, 44 and 45 has an elongated shape extending in the direction of the major axis of the vibrator 41. Although the electrodes are omitted from illustration in FIG. 16 and ensuing figures, which are perspective views showing embodiments of the present invention, the electrodes extend in the major axis similarly to that shown in FIG. 13.

As shown in FIG. 15, a drive power source 46 for generating a high-frequency electric power is connected to the drive electrode 44. The drive electrode 44 and the drive power source 46 form a drive means. A detection lead line is connected to the detection electrode 45, and a detection output terminal 47 is formed between the foregoing lead line and the ground potential, the detection output terminal 47 being connected to a detection circuit. The detection electrode 45 and the detection output terminal 47 form the detection means according to the present invention. An added mass mO is provided on the leading portion (free end) of the vibrator 41. The added mass mO projects in the –X direction from the vibrator 41 such that the center of gravity of the added mass mO is deviated in the –X direction with respect to the central axis O of the vibrator 41.

The vibratory gyroscope according to this embodiment detects the angular velocity ω in a rotating system about the Z-axis, the detection output capable of detecting the rotation about the Z-axis being indicated by Ωz. When high-frequency electric power is applied from the drive power source 46 to the drive electrode 44, positive and negative distortions are alternately generated in a portion of the crystal to which the drive electrode 44 is connected. As a result, the vibrator 41 is bending-vibrated in the X direction (a first direction), as shown in FIG. 14. When the vibrator 41, which is being vibrated in the X direction, is placed in a rotating system about the Z-axis, Coriolis force in the Y direction perpendicular to the relative velocity in the X direction in the rotating system acts on the vibrator 41. Since the Coriolis force acts in the major axis of the vibrator 41 in the foregoing case, the added mass mO causes force +Fy in the Y direction to act on the center of gravity, which is the deviated position. The force +Fy causes moment about Z-axis acts on the leading portion of the vibrator 41. As a result, the vibrator 41 is deformation-vibrated in the first direction (the X direction), which is the same as the drive direction. The deformation vibration of the vibrator 41 in the X direction causes the side surface of the vibrator 41 in the –X direction to be distorted. The distortion is, as the voltage (or an electric current), detected by the detection electrode 45 shown in FIG. 15. A detected voltage level (or an electric current), which is the mixture of the drive vibration component in the X direction and the vibration component in the X direction, can be obtained from the detection output terminal 47. By removing the drive vibration component from the detected voltage, the Coriolis force in the rotating system about the Z-axis can be detected. In accordance with the detection output of the Coriolis force, the angular velocity ω is calculated.

When the vibratory gyroscope shown in FIG. 13 is rotated about the Y-axis, Coriolis force acts in a second direction (the Z direction) perpendicular to the X direction. As a result, vibrations in the Z direction are generated in the vibrator 41. Since the detection electrode 45 is disposed on the side surface (the side surface extending in the Z direction) of the vibrator 41 that opposes the X direction, the detection means consisting of the detection electrode 45 and the detection output terminal 47 does not detect the vibration component in the Z direction. As a result, only the angular velocity in the rotating system about the Z-axis can be detected.

By making the vibrator 41 by polycrystal piezoelectric material and by determining the polarizing direction and the configuration of the electrodes, the detection electrodes formed on the two sides opposing the Z direction (the upper and lower surfaces shown in FIG. 15) are able to detect vibrations in the X direction. In the foregoing case, use of the relationship between the dielectric polarization direction of the piezoelectric material and the detection electrode enables a structure to be formed in which the voltage generated due to the vibrations in the Z direction is compensated between the electrodes. As a result of the foregoing structure, a structure can be formed in which the output of the detected rotation about the Y-axis cannot be obtained from the detection output terminal 47. Thus, only the output denoting the detected rotation about the Y-axis (the output denoting detected Ωy) can be obtained.

Fifth Embodiment

Figure 16:
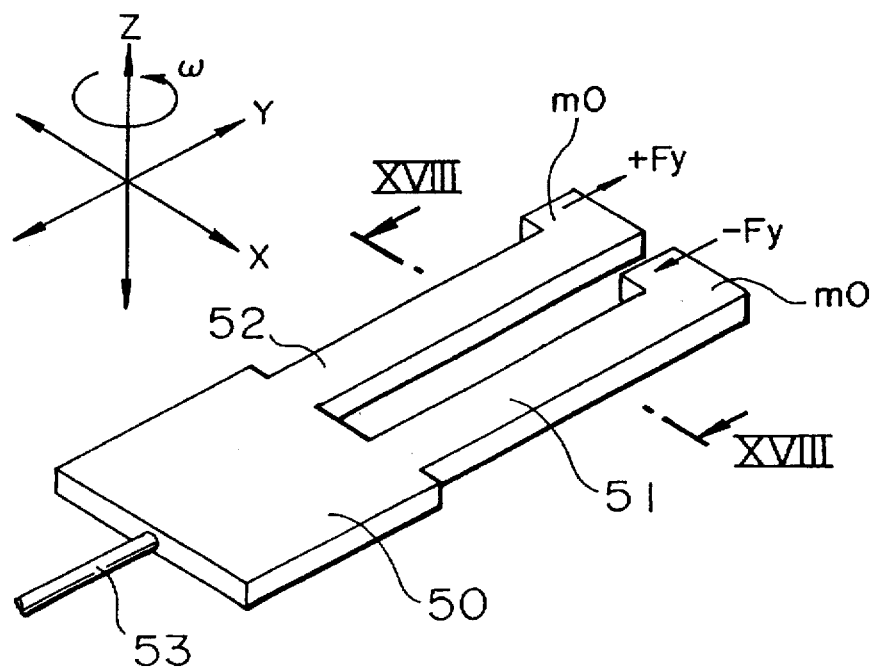
FIG. 16 is a perspective view showing a vibratory gyroscope according to a fifth example of the present invention.
Figure 17A:
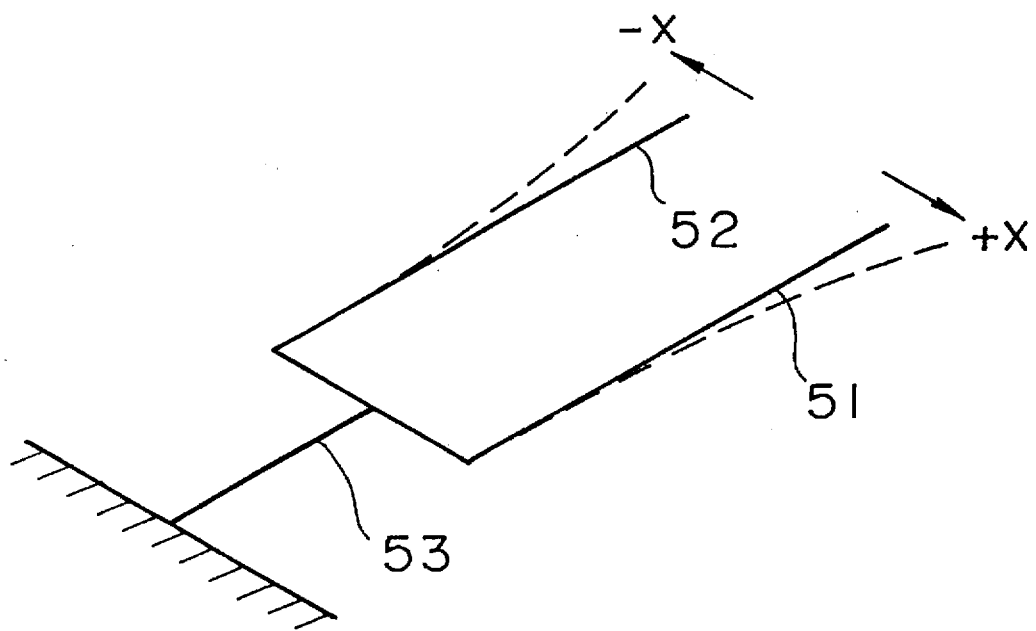
Figure 17B:
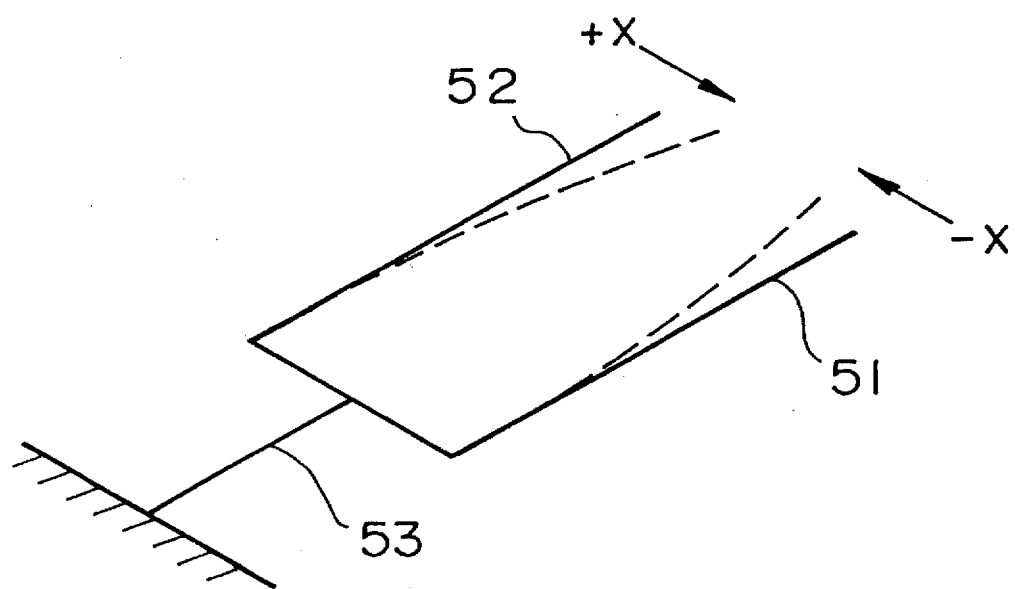

FIG. 16 is a perspective view showing a vibratory gyroscope according to a fifth embodiment of the present invention. FIG. 17A is a view of explanatory showing a drive vibration mode, FIG. 17B is a view of explanatory showing a detection vibration mode, FIG. 18A is a diagram showing the dielectric polarization direction of the piezoelectric material, such as piezoelectric ceramic, and the configuration of the electrodes, and FIG. 18B is a cross sectional view taken along line XVIII—XVIII of FIG. 16 and showing another embodiment of the direction of the electric field of crystal and the configuration of the electrodes.

The vibratory gyroscope according to this embodiment comprises two (plate-like) parallel vibrators 51 and 52 extending from a flat elastic member 50. The central portion of the base of the elastic member 50 is supported by a support rod 53. The elastic member 50 and the vibrators 51 and 52 are made of piezoelectric material. As shown in FIG. 16, added masses mO deviated in the first direction (the X direction) are disposed in the leading portions of the two vibrators 51 and 52. In each of the leading portions of the vibrators 51 and 52, the center of gravity is deviated in the –X direction with respect to the central axis of the vibrator.

Figure 18A:
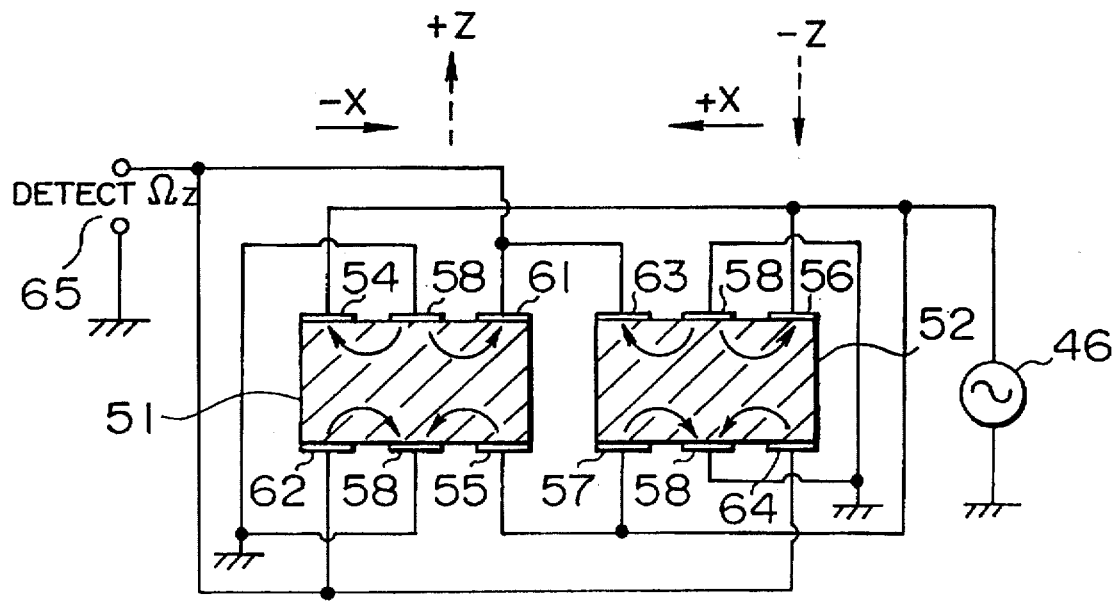
FIG. 18A is a diagram showing the polarizing directions of the piezoelectric material forming the vibrator according to the fifth example and the configuration of the electrodes of the same, FIG. 18A being a cross sectional view taken along line XVIII—XVIII of FIG. 16.
Figure 18B:
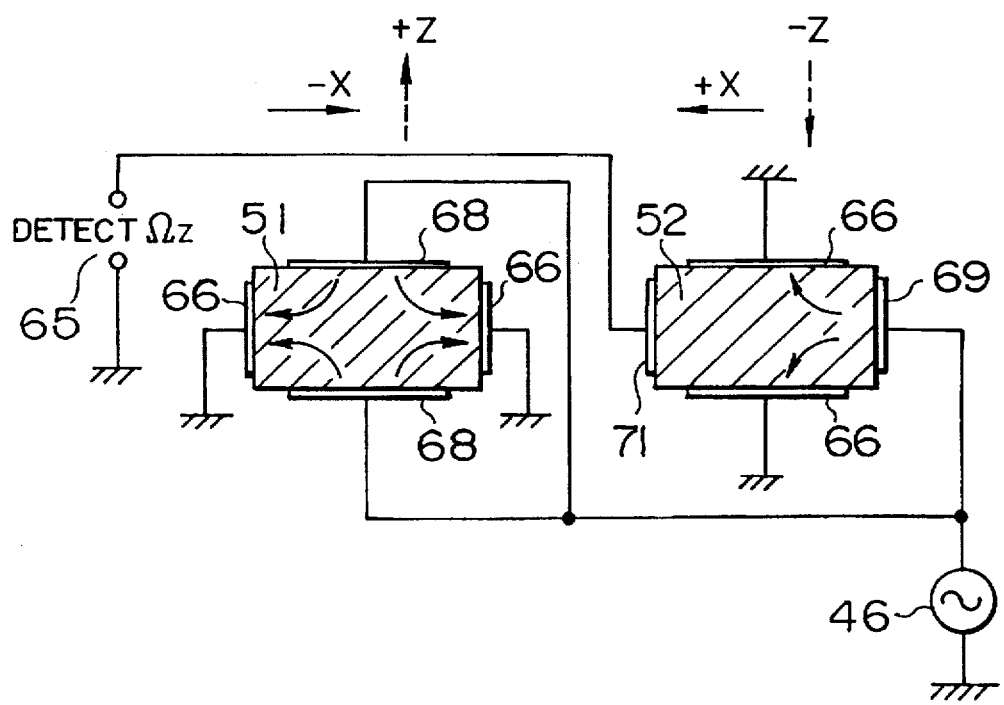
FIG. 18B is a diagram showing the directions of electric fields and the configuration of the electrodes in the case where the vibrator is made of crystal, FIG. 18B being a cross sectional view taken along line XVIII—XVIII of FIG. 16.

In the embodiment shown in FIG. 18A, the vibrators 51 and 52 are made of polycrystal material, such as piezoelectric ceramic, and the dielectric polarization directions of which are determined as indicated by arrows of FIG. 18A. All electrodes are formed on the two sides of the vibrators 51 and 52 that oppose the Z direction. Each electrode is formed to extend in the Y direction.

The structure shown in FIG. 18A comprises drive electrodes 54 and 55 on the two sides of the vibrator 51. Furthermore, drive electrodes 56 and 57 are formed on the two sides of the vibrator 52. The foregoing electrodes are supplied with high frequency electric power from a drive power source 46. The drive electrodes and the drive power source 46 form a drive means. Reference numerals 58 represent ground electrodes. The drive power source 46 supplies electric power in the same phase to each of the drive electrodes 54, 55, 56 and 57. When a phase at a certain moment of the electric power supplied from the drive power source 46 causes the portions of the piezoelectric material forming the drive electrodes 54 and 56 to be negatively distorted (contraction distorted), portions of the piezoelectric material forming the drive electrodes 55 and 57 are positively distorted (expansion distorted). Therefore, the vibrators 51 and 52 are vibrated in the X direction (the first direction) in phases which are different from each other by 180°. That is, when the amplitude of the vibrator 51 is in the +X direction at a certain moment as shown in FIG. 17A, the amplitude of the vibrator 52 is in the –X direction.

When the vibratory gyroscope vibrating as described above is placed in a rotating system about the Z-axis, Coriolis force acts in Y direction perpendicular to the X-axis. Since the added mass mO deviated in the X direction is provided for each of the vibrators 51 and 52, moments about the Z-axis act so that the vibrators 51 and 52 are vibrated in the first direction (the X direction). Since the two vibrators 51 and 52 are, as shown in FIG. 17A, being driven at a relative velocity in the opposite amplitude directions, the Coriolis forces Fy in the Y direction are opposite to each other. Thus, when +Fy acts on either of the vibrators 51 and 52, -Fy acts on the other vibrator. Therefore, the vibrators 51 and 52 are vibrated in the X direction in the opposite amplitude directions.

The vibrations in the X direction are detected by the detection means. The detection means is formed by detection means electrodes 61, 62, 63 and 64. When the direction of the amplitude of the vibrations in the X direction generated due to the Coriolis force is as shown in FIG. 17B at a certain moment, portions of the piezoelectric material forming the detection electrodes 61 and 63 are negatively distorted. On the other hand, the detection electrodes 62 and 64 are positively distorted. Since the dielectric polarization direction in the portions in which the detection electrodes 61 and 63 are provided, and that in the portions in which the detection electrodes 62 and 64 are provided, oppose each other, detection voltages (or electric current) in the same phase can be obtained from the respective detection electrodes 61, 62, 63 and 64. Therefore, the output denoting the detected rotation about the Z-axis (the output denoting detected nz) can be obtained from the detection output terminal 65. Note that the detection means may comprise an addition circuit for adding the detected voltages obtained from the detection electrodes 61, 62, 63 and 64.

If the detection output is obtained on the basis of the drive output (component), only the output due to the Coriolis force can be extracted.

When the vibratory gyroscope shown in FIG. 16 is placed in a rotating system about the Y-axis, Coriolis force acts in the second direction (Z direction) perpendicular to the first direction (X direction) which is the drive direction. Thus, each of the vibrators 51 and 52 are vibrated in the Z direction. Since the vibrators 51 and 52 are vibrated in the X direction in opposite amplitudes, the directions of amplitudes of the vibrators 51 and 52 in the Z direction are in opposite phases. That is, when the direction of amplitude of the vibrator 51 is in the +Z direction at a certain moment, the direction of amplitude of the vibrator 52 is in the -Z direction, as indicated by dashed arrows shown in FIG. 18A. When the vibrators 51 and 52 are being deformed in the foregoing directions of the amplitudes, the portion of the piezoelectric material forming the detection electrode 61 is negatively distorted. The portion of the piezoelectric material forming the detection electrode 63, to which the same dielectric polarization direction is directed as that directed to the detection electrode 61, is positively distorted. Therefore, the phases of the detection voltages (or electric currents) from the two detection electrodes 61 and 63 are different from each other by 180° so that the detection voltages are compensated. The same phenomenon takes place for the detection electrodes 62 and 64.

Therefore, only the vibration component in the X direction is extracted from the detection output terminal 65, and the vibration component in the Z direction is not extracted. From the detection output terminal 65, only the output denoting detected Ωz, which is the output denoting the component of rotation about the Z-axis, is obtained.

FIG. 18B shows a case where the vibrators 51 and 52 are made of crystal, the crystal orientation of which is realized by a Z-crystal plate at the cut angle rotated +2° about the X-axis. The arrows shown in FIG. 18B indicate the directions of electric fields. Each of the vibrators 51 and 52 comprise a ground electrode 66. Drive electrodes 68 are formed on the two sides of the vibrator 51 in the Z direction, while drive electrode 69 is formed on the side surface of the vibrator 52 in the -X direction. When high-frequency electric power is supplied from the drive power source 46 to the two drive electrodes 68 and 69, the vibrators 51 and 52 are vibrated in the first direction (X direction) in the phase in which the directions of the amplitudes oppose each other, as shown in FIG. 17A.

On the side surface of the vibrator 52 in the +X direction, there is formed a detection electrode 71. When the vibrators 51 and 52 are placed in a rotating system about the Z-axis, the Coriolis force vibrates the vibrators 51 and 52 in the X direction in the opposite amplitude directions. Therefore, detection voltage (or an electric current) of the vibrations in the X direction can be obtained from the detection electrode 71. Even if vibrations in the Z direction act on the vibrators 51 and 52 due to the rotations about the Y-axis, the foregoing vibrations are not detected from the detection electrode 71. Therefore, only the output denoting detected Ωz, which is the output denoting the result of detection of rotations about the Z-axis, can be obtained.

Sixth Embodiment

Figure 20A:
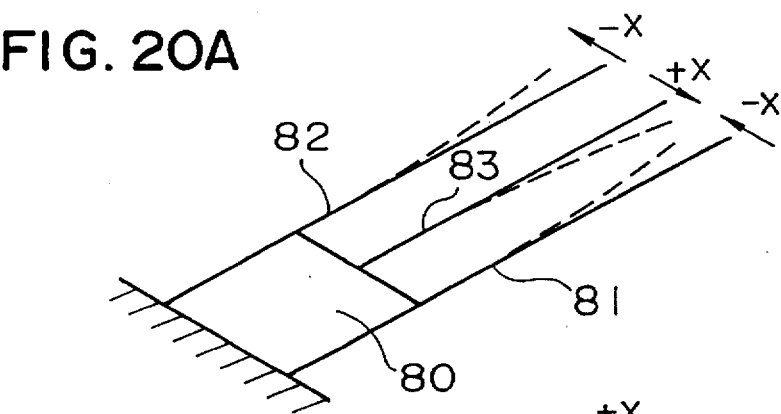
Figure 20B:
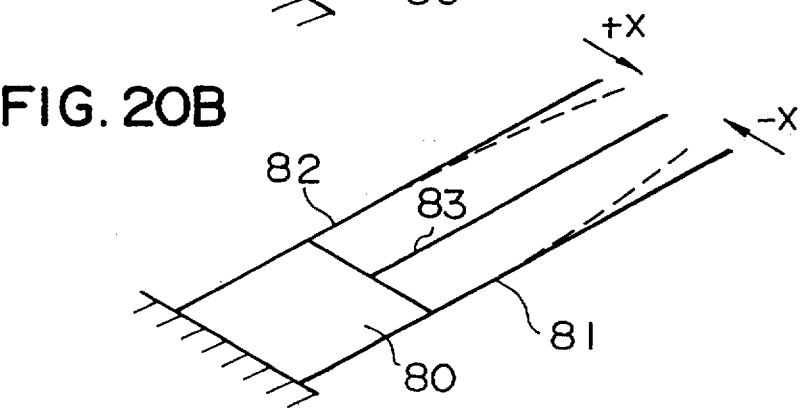
Figure 21A:
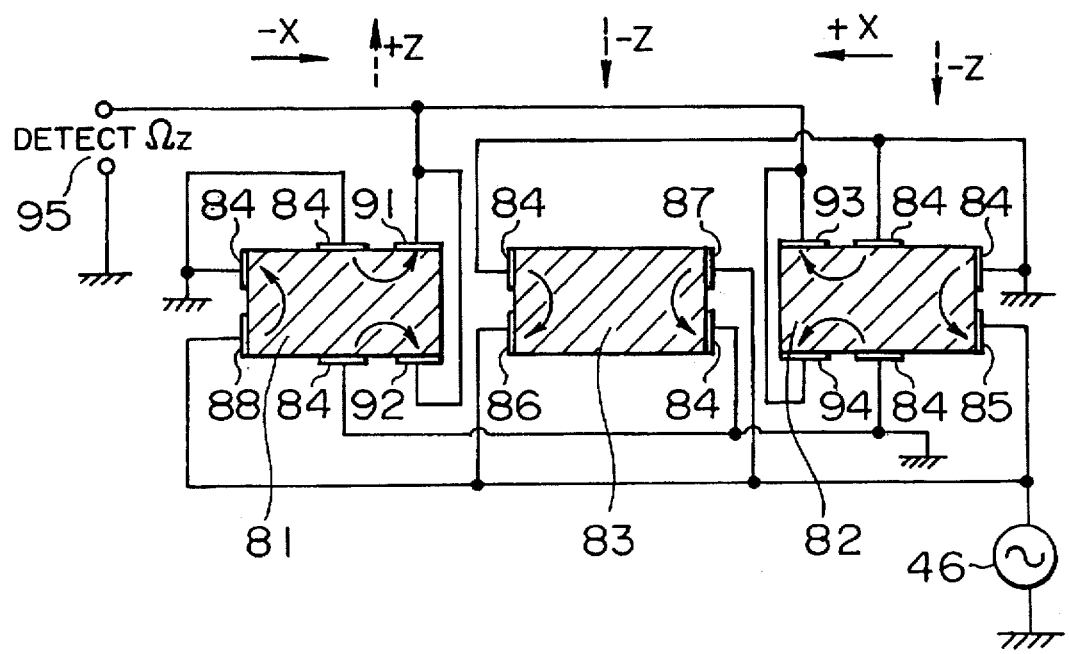
FIG. 21A is a diagram showing the polarizing directions of the piezoelectric material forming the vibrator according to the sixth example and the configuration of the electrodes of the same, FIG. 21A being a cross sectional view taken along line XXI—XXI of FIG. 19.
Figure 21B:
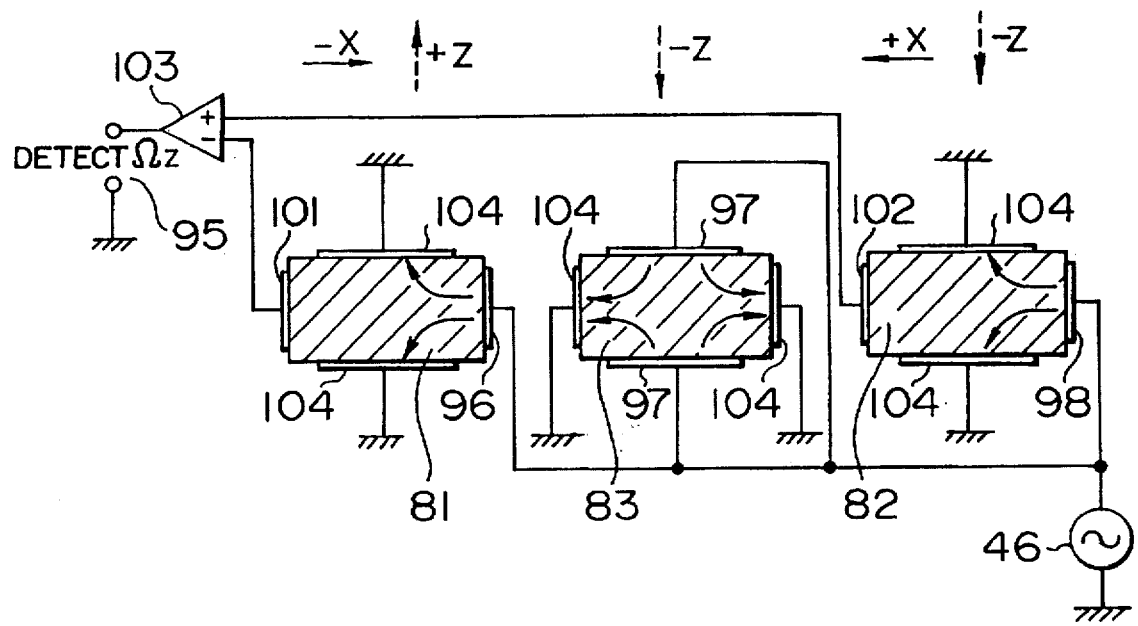
FIG. 21B is a diagram showing the directions of electric fields and the configuration of the electrodes in the case where the vibrator is made of crystal, FIG. 21B being a cross sectional view taken along line XXI—XXI of FIG. 19.

FIG. 19 is a perspective view showing a vibratory gyroscope according to a third embodiment of the present invention. FIG. 20A is a view of explanatory showing a drive vibration mode. FIG. 20B is a view of explanatory showing a detection vibration mode. FIG. 21A is a diagram showing the dielectric polarization directions of the piezoelectric material forming the vibrator and the configuration of electrodes. FIG. 21B is a diagram showing the directions of electric fields of crystal forming the vibrator and the configuration of electrodes of another embodiment. FIGS. 21A and 21B are cross sectional views taken along line XXI—XXI of FIG. 19.

The vibratory gyroscope according to this embodiment comprises three (plate-like) parallel vibrators 81, 82 and 83 extending from a flat elastic member 80. The elastic member 80 and the vibrators 81, 82 and 83 are made of piezoelectric material. In the leading portions of the right and left vibrators 81 and 82, there are disposed added masses mO deviated in the first direction (the X direction). The directions of the deviations of the added masses mO are opposite between the two vibrators 81 and 82 such that the center of gravity is deviated in the +X direction with respect to the central axis of the vibrator 81 and the center of gravity is deviated in the -X direction with respect to the central axis of the vibrator 82.

In the embodiment shown in FIG. 21A, the vibrators 81, 82 and 83 are made of piezoelectric ceramic, and their dielectric polarization directions are determined as indicated by arrows shown in FIG. 21A. Electrodes are formed on at least one of the side surfaces of each of the vibrators 81, 82 and 83. All electrodes are formed to extend in the Y direction.

As shown in FIG. 21A, ground electrodes 84 are provided for the vibrators 81, 82 and 83. The drive electrodes 85, 86, 87 and 88 and the drive power source 46 form the drive means. High-frequency electric power from the drive power source 46 is, in the same phase, supplied to the drive electrodes 85, 86, 87 and 88. The dielectric polarization direction of the piezoelectric material acting on the drive electrodes 85 and 86 oppose the dielectric polarization direction acting on the drive electrodes 87 and 88. Therefore, if the portions of the piezoelectric material forming the drive electrodes 85 and 86 are negatively distorted at a certain moment, the portions of the piezoelectric material forming the drive electrodes 87 and 88 are positively distorted. At the foregoing moment, the direction of the amplitudes of the right and left vibrators 81 and 82 are in the −X direction and the direction of the amplitude of the central vibrator 83 is in the +X direction, as shown in FIG. 20A. That is, the right and left vibrators 81 and 82 and the central vibrator 53 are driven in the symmetrical mode to vibrate in the opposite phases in the first direction (the X direction).

The structure, in which the three vibrators vibrate in the symmetrical phases as described above, enables the base of the elastic member 80 (having no vibrator) to be stabilized. Therefore, only a small portion of the vibrations is transmitted to the base. Therefore, even if the base of the elastic member 80 is supported in a rigid manner as shown in FIG. 20, the vibration mode of each vibrator is not affected.

When the vibratory gyroscope, described above, is placed in a rotating system about the Z-axis, Coriolis force acts in the Y direction which is perpendicular to the X-axis drive direction. Since added masses mO deviated in the X direction are provided on the right and left vibrators 81 and 82, moments about the Z axis act on the vibrators 81 and 82 due to the Coriolis force in the Y direction. As a result, the vibrators 81 and 82 are vibrated in the first direction (the X direction). Since no added mass is provided for the central vibrator 83, the Coriolis force acts does not act on the vibrator 83, and the central vibrator 83 is not vibrated.

The right and left vibrators 81 and 82 are driven in the X direction in the same direction of the amplitude. The directions, in which the added masses mO are deviated in the two vibrators 81 and 82, are −X direction and +X direction (i.e., opposite to each other). When the right and left vibrators 81 and 82 are, as shown in FIG. 20A, being driven in the −X direction at the relative velocity, the Coriolis forces in the Y direction acting on the vibrators 81 and 82 in the same direction (+Fy). Therefore, the added masses mO cause the vibrators 81 and 82 to be vibrated in the X direction in the opposite amplitude directions, as shown in FIG. 20B.

In this embodiment, the vibrations of the right and left vibrators 81 and 82 in the X direction are detected by the detection means. In the structure shown in FIG. 21A, the detection means is formed by detection electrodes 91, 92, 93 and 94 and a detection output terminal 95. If the direction of amplitude of the vibrations in the X direction generated due to the Coriolis force is as shown in FIG. 20B at a certain moment, the piezoelectric material forming the detection electrodes 91 to 94 is negatively distorted. Since the dielectric polarization directions of the piezoelectric material, in which the detection electrodes 91 to 94 are formed, are the same, detection voltages (or electric currents) in the same phase can be obtained from the detection electrodes 91, 92, 93 and 94. Therefore, detection voltages from the detection electrodes can be obtained through the detection output terminal as the output denoting detected Ωz. Note that an addition circuit for adding the detected voltages obtained from the detection electrodes 91, 92, 93 and 94 may be provided.

When the vibratory gyroscope is placed in a rotating system about the Y-axis, Coriolis force acts in the second direction (the Z direction), which is perpendicular to the first direction (the X direction), which is the drive direction. Thus, the vibrators 81, 82 and 83 are vibrated in the Z direction by the Coriolis force. Since the right and left vibrators 81 and 82 and the central vibrator 83 are driven to vibrate in opposite X directions, the Coriolis force in the Z direction vibrates the right and left vibrators 81 and 82 and the central vibrator 83 in opposite directions. That is, if the directions of amplitudes of the right and left vibrators 81 and 82 are in the +Z direction at a certain moment, the direction of the amplitude of the central vibrator 83 is in the −Z direction, as shown in FIG. 21A.

At this time, the piezoelectric material forming the detection electrodes 91 and 93 is negatively distorted, while the piezoelectric material forming the detection electrodes 92 and 94 is positively distorted. Since the dielectric polarization directions of the piezoelectric material forming the detection electrodes 91, 92, 93 and 94 are the same, detection voltages due to the vibrators in the Z direction are compensated. Therefore, the vibration component due to the Coriolis force about the Y-axis is not detected in the detection output terminal 95, whereas only the output denoting detected Ωz, which is the output denoting the result of detection of rotations about the Z-axis, is obtained.

FIG. 21B shows a case where the vibrators 81, 82 and 83 shown in FIG. 19 are made of crystal, the crystal orientation of which is realized by a Z-crystal plate at the cut angle rotated +2° about the X-axis. The arrows shown in FIG. 21B indicates the directions of electric fields. On the side surfaces of the right and left vibrators 81 and 83 in the −X direction, there are formed drive electrodes 96 and 98. On the two sides of the central vibrator 83 in the Z direction, there is formed paired drive electrodes 97. When high-frequency electric power is supplied from the drive power source 46 to the drive electrodes 96, 97 and 98, the right and left vibrators 81 and 82 and the central vibrator 83 are vibrated in the first direction (the X direction) in the phase in which their amplitude directions are opposite to each other, as shown in FIG. 20A.

Detection electrodes 101 and 102 are formed on the side surfaces of the right and left vibrators 81 and 82. When the vibratory gyroscope is placed in a rotating system about the Z-axis, the right and left vibrators 81 and 82 are, due to the Coriolis force, vibrated in the X direction in the opposite amplitude directions, as shown in FIG. 20B. Therefore, detection voltages in the opposite phases can be obtained from the detection electrodes 101 and 102. As a result, a differential circuit (a subtraction circuit) 103 is operated to obtain the difference in the detection voltage (or the electric current) between the two detection electrodes 101 and 102. Thus, the component generated due to the Coriolis force in the rotating system about the Z-axis can be detected.

In the structure shown in FIG. 21B, if the vibrators 81 and 82 are vibrated in the Z direction due to the rotations about the Y-axis, the foregoing vibrations are not detected from the detection electrodes 101 and 102. Thus, noise generated due to the vibrations in the Z direction is not superimposed on the output denoting detected Qz Obtained from the detection output terminal 95.

Seventh Embodiment

Figure 23A:
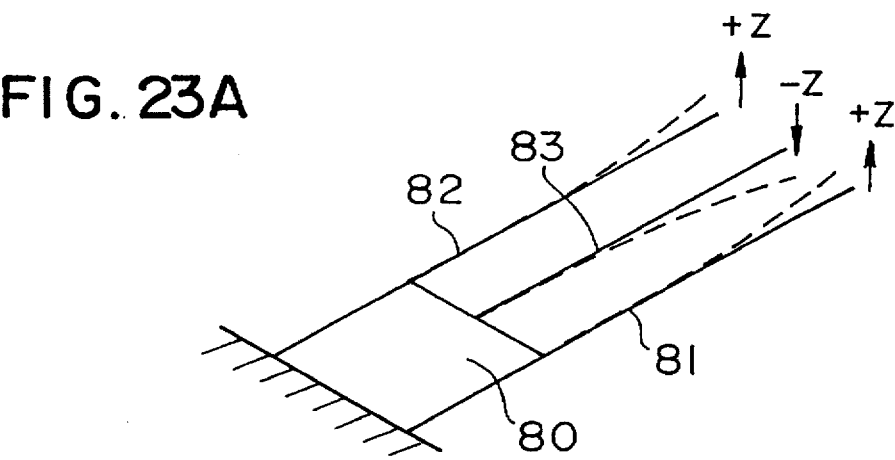
Figure 23B:
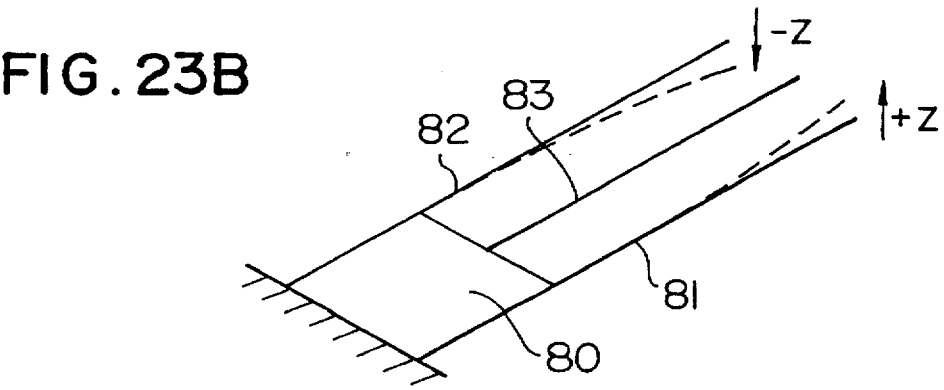
Figure 24A:
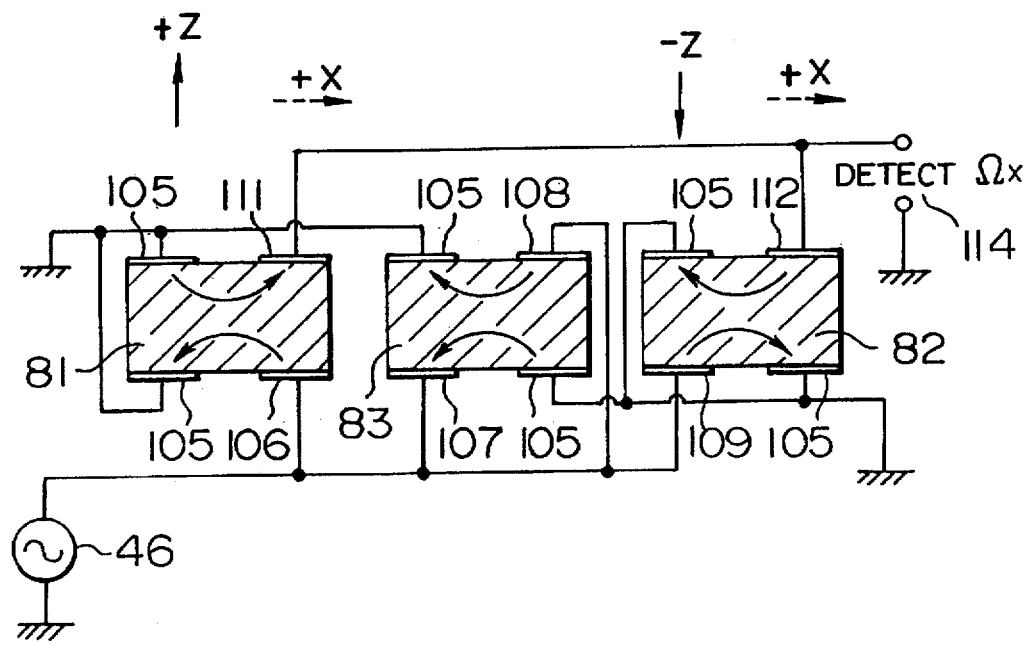
FIG. 24A is a diagram showing the polarizing directions and the configuration of the electrodes of the vibrator according to the seventh example, FIG. 24A being a cross sectional view taken along line XXIV—XXIV of FIG. 22.
Figure 24B:
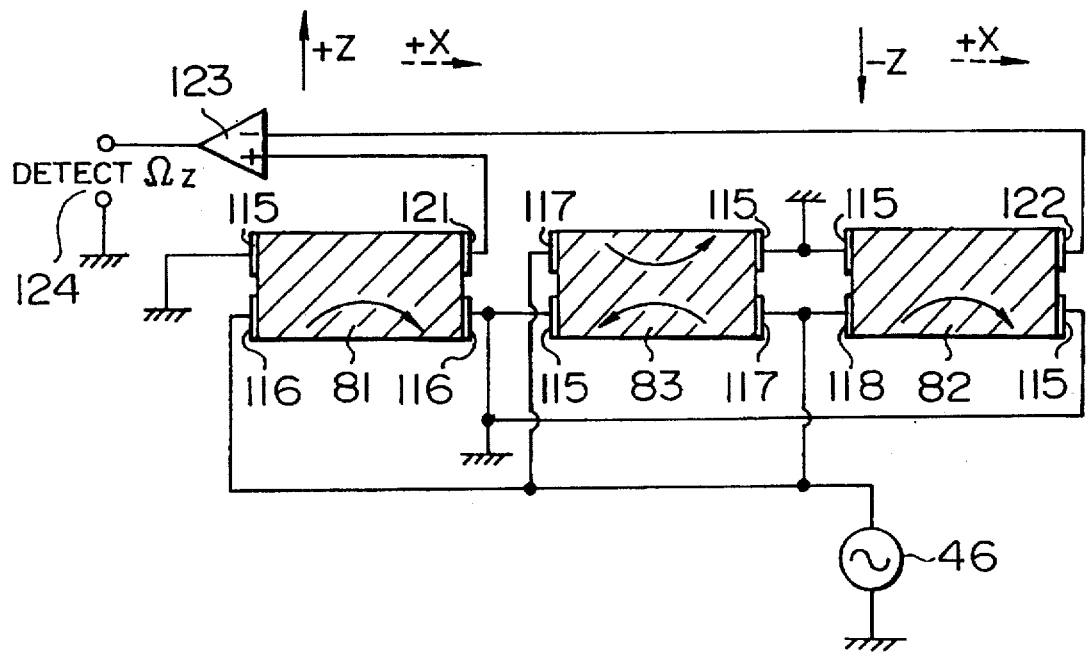
FIG. 24B is a diagram showing the directions of electric fields and the configuration of the electrodes in the case where the vibrator is made of crystal, FIG. 24B being a cross sectional view taken along line XXIV—XXIV of FIG. 22.

FIG. 22 is a perspective view showing a vibratory gyroscope according to a seventh embodiment of the present invention. FIG. 23A is a view of explanatory showing a drive vibration mode, and FIG. 23B is a view of explanatory showing a detection vibration mode. FIG. 24A is a diagram showing the dielectric polarization directions of the piezoelectric material forming the vibrators and the configurations of the electrodes. FIG. 24B is a diagram showing the directions of electric fields of crystal forming the vibrators and the configuration of electrodes according to another embodiment of the present invention. FIGS. 24A and 24B are cross sectional views taken along line XXIV—XXIV of FIG. 22.

Similarly to the vibratory gyroscope according to the embodiment shown in FIG. 19, the vibratory gyroscope according to this embodiment comprises three (plate-like) parallel vibrators 81, 82 and 83 formed integrally with an elastic member 80 made of piezoelectric material. Although added masses mO are provided in the leading portions of the right and left vibrators 81 and 82, the structure is different from that of the embodiment shown in FIG. 19 in that the added masses mO project in the Z direction. The center of gravity of the vibrator 81 is deviated in the –Z direction with respect to the central line thereof due to the added mass mO. The center of gravity of the vibrator 82 is deviated in the +Z direction. This embodiment enables the angular velocity ω in the rotating system about the X-axis.

In the seventh embodiment, the first direction, in which the vibrators 81, 82 and 83 are vibrated, is the Z direction. In the foregoing drive mode, the vibration phases of the right and left vibrators 81 and 82 and the central vibrator 83 in the Z direction are different from each other by 180°, as shown in FIG. 23A. When the directions of amplitudes of the right and left vibrators 81 and 82 are in the +Z direction at a certain moment, the direction of the amplitude of the central vibrator 83 is in the –Z direction.

When the vibratory gyroscope, which is being driven in the foregoing mode, is placed in a rotating system about the X axis, Coriolis forces in the Y direction act on the vibrators 81, 82 and 83. Since the central vibrator 83 has no added mass and the Coriolis force acts in the major axis thereof, the vibrator 83 is not vibrated. Since the right and left vibrators 81 and 82 are driven in the same direction, Coriolis forces in the Y direction in the same phase act on the two vibrators 81 and 82. When the right and left vibrators 81 and 82 are, in this embodiment, driven at a velocity in the +Z direction as shown in FIG. 23A, Coriolis forces in the +Fy direction act on the vibrators 81 and 82. Since the added masses mO projecting in the Z direction in the opposite directions are provided for the right and left vibrators 81 and 82, Coriolis forces in the rotating system about the Z-axis vibrate the right and left vibrators 81 and 82 in the Z direction in the opposite phases, as shown in FIG. 23B. By detecting the vibrations of the vibrators 81 and 82 in the Z direction (the first direction), the detection output Ωx about the X-axis can be obtained.

FIG. 24A shows an embodiment in which vibrators 81, 82 and 83 are made of piezoelectric material, that is, piezoelectric ceramic. The dielectric polarization directions of the piezoelectric material are as indicated by arrows. The electrodes shown in FIG. 24A are formed to extend in the direction of the Y-axis. Reference numeral 105 represents ground electrodes among the foregoing electrodes.

The high-frequency electric power supplied from the drive power source is, in the same phase, supplied to the drive electrodes 106, 107, 108 and 109. In the piezoelectric material forming the drive electrodes 106, 108 and 109, the dielectric polarization directions are the same. In the piezoelectric material forming the drive electrode 107, the dielectric polarization direction is in the opposite direction. Therefore, the right and left vibrators 81 and 82 and the central vibrator 83 are driven in the Z direction in the opposite phase directions, as shown in FIG. 24A.

When the vibratory gyroscope is placed in a rotating system about the X-axis, the Coriolis forces vibrate the right and left vibrators 81 and 82 in the Z direction in the opposite phase, as shown in FIG. 24B. The vibrations are detected by detection electrodes 111 and 112. The detection electrodes 111 and 112 are vibrated in the opposite phases in the Z direction due to the Coriolis force. In the portions of the two detection electrodes 111 and 112, the dielectric polarizing direction are opposite to each other. Therefore, the detection voltages (or electric currents) in the same phase can be obtained from the two detection electrodes 111 and 112. On the other hand, the Ωx detection output of the rotational component about the X-axis can be obtained from the detection output terminal 114.

When the vibratory gyroscope shown in FIG. 22 is placed in a rotating system about the Y-axis, each of the vibrators 81, 82 and 83 is vibrated in a second direction (X direction) perpendicular to the first direction (the Z direction) which is the drive direction. Since the right and left vibrators 81 and 82 are driven in the Z direction in the same phase as shown in FIG. 23A, the Coriolis force given in a rotating system about the Y-axis causes the right and left vibrators 81 and 82 to be vibrated in the X direction in the same phase. If the amplitude directions of the right and left vibrators 81 and 82 are in the +X direction, the piezoelectric material of the portions, in which the detection electrodes 111 and 112 are disposed, is negatively distorted. Since the dielectric polarizing directions oppose each other in the portions of the detection electrodes 111 and 112, the vibration component in the X direction causes the phases of the voltages (or electric currents) detected at the detection electrodes 111 and 112 to be different from each other by 180°. Therefore, they are compensated and are not allowed to appear at the detection output terminal 114. Therefore, only the Ωx detection output, which is the rotation detection output about the X-axis, is obtained at the detection output terminal 114, and the Coriolis force given in the rotating system about the Y-axis is not detected.

FIG. 24B shows the directions of electric fields in the case where the vibrators 81, 82 and 83 are made of a crystal, the direction of crystal of which is X-crystal plate at the cut angle rotated +0° about X-axis. Ground electrodes 115 are formed on the side surfaces that oppose the X direction of each vibrator. The high-frequency electric power is supplied from the drive power source 46 to the drive electrodes 116, 117 (two portions) and 118. As shown in FIG. 23, the right and left vibrators 81 and 82 and the central vibrator 83 are driven in the opposite amplitude directions in the Z direction.

The right and left vibrators 81 and 82 are vibrated in the opposite phases in the Z direction due to the Coriolis force in the rotating system about the X-axis. The foregoing vibrations are detected by the detection electrodes 121 and 122. As shown in FIG. 23B, the vibrations in the Z direction to be given to the right and left vibrators 81 and 82 due to the Coriolis force in the rotating system about the X-axis are in opposite phases. Since the detection voltages in opposite phases are obtained at the detection electrodes 121 and 122, the outputs from the two detection electrodes 121 and 122 pass through the differential circuit so that only the output Ωx, denoting the detected rotation about X-axis, is obtained at the detection output terminal 124.

When the vibratory gyroscope shown in FIG. 22 is rotated about the Y-axis, the right and left vibrators 81 and 82 are vibrated in the X direction in the same phase. The vibrations are not detected by the detection electrodes 121 and 122 but only the output denoting detected Ωx is obtained from the detection output terminal 124.

Eighth Embodiment

Figure 25:
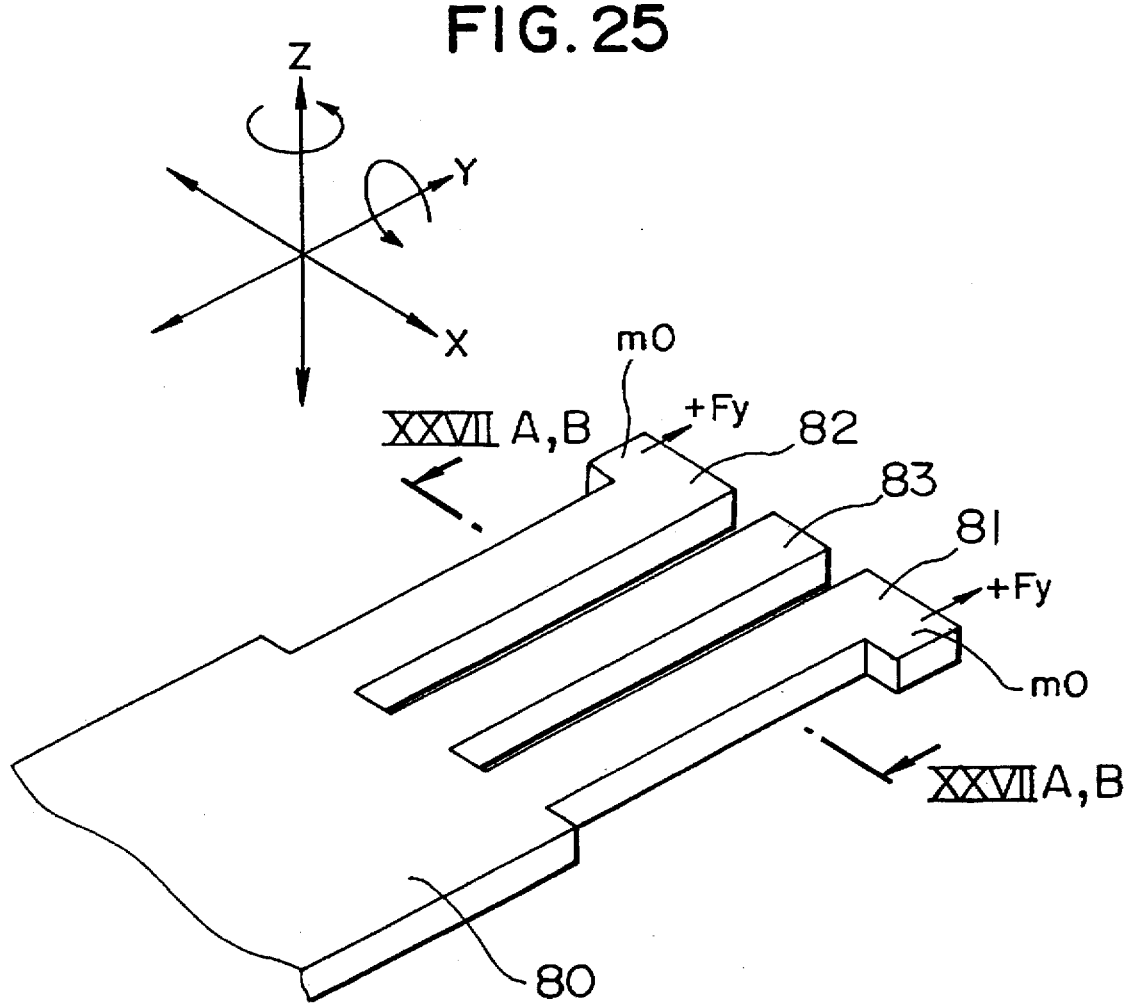
FIG. 25 is a perspective view showing a vibratory gyroscope according to an eighth example of the present invention.
Figure 26A:
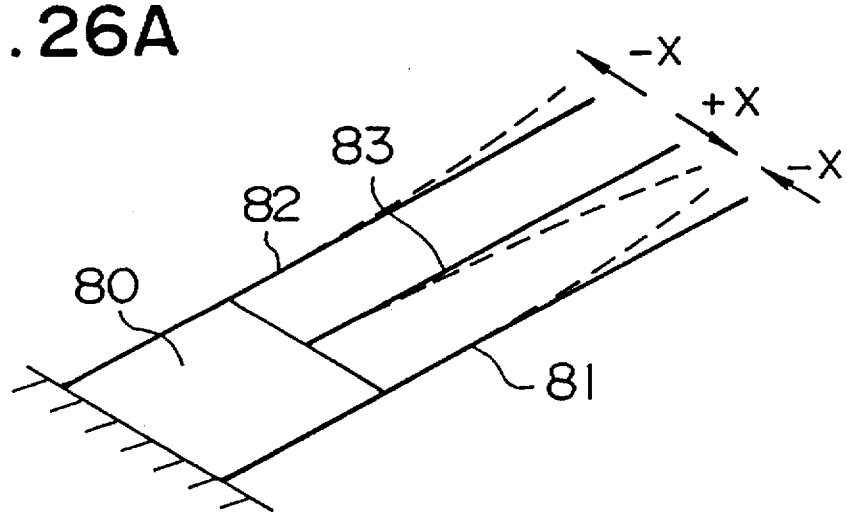
Figure 26B:
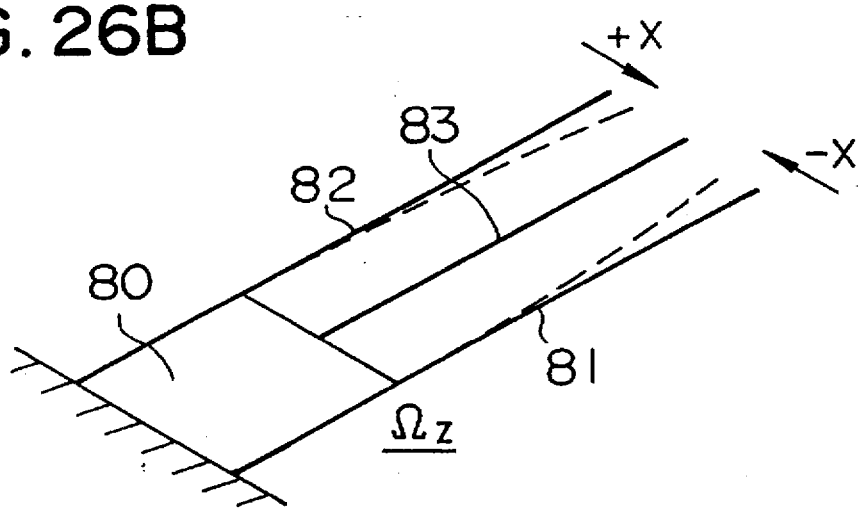
Figure 26C:
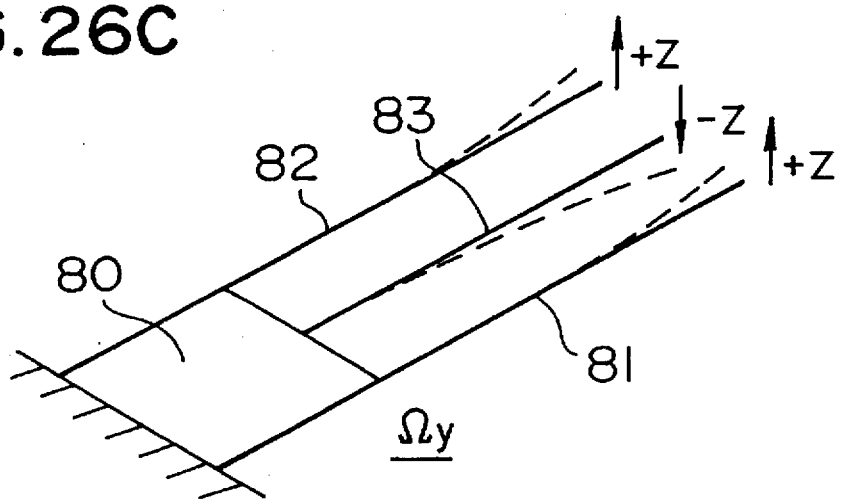
Figure 27A:
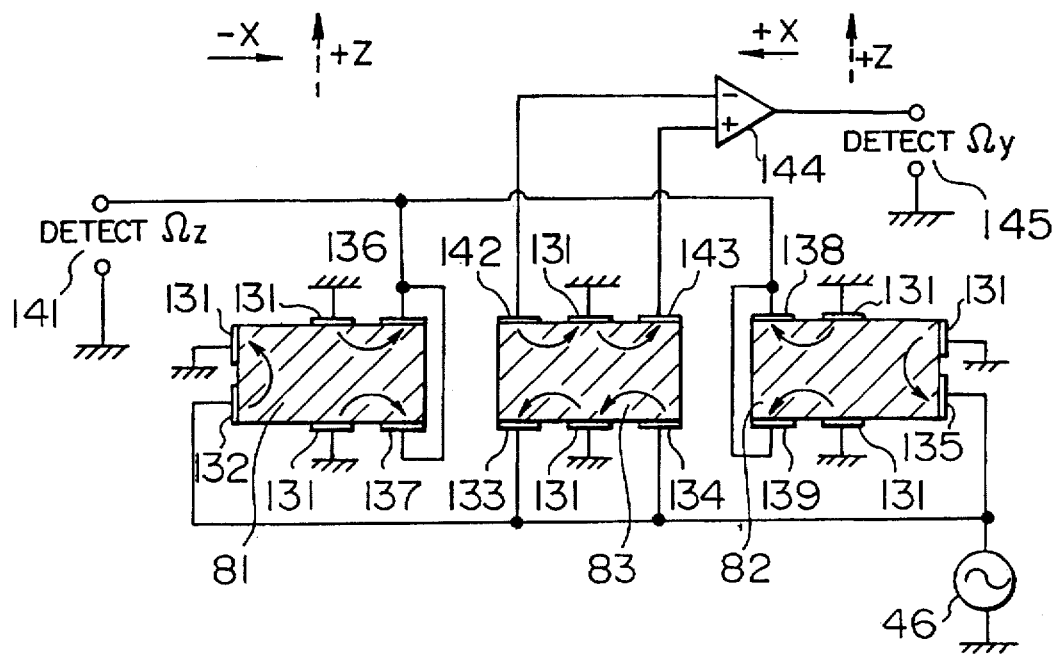
FIG. 27A is a diagram showing the polarizing directions of the piezoelectric material forming the vibrator according to the eighth example and the configuration of the electrodes of the same, FIG. 27A being a cross sectional view taken along line XXVII—XXVII of FIG. 25.
Figure 27B:
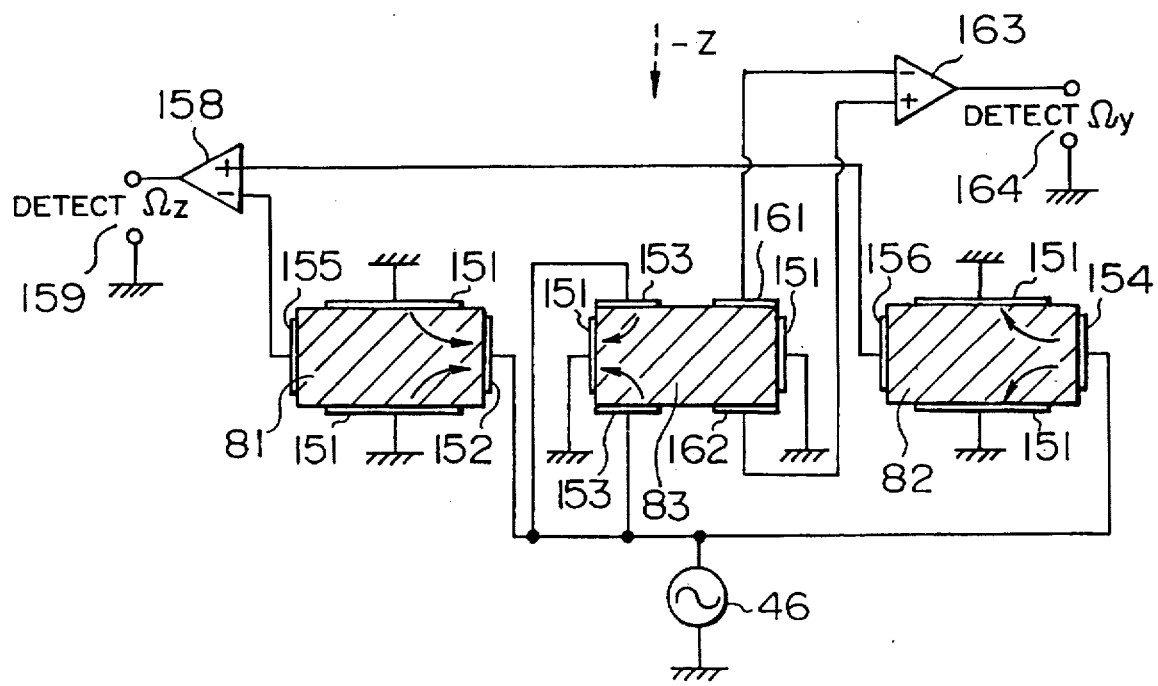
FIG. 27B is a diagram showing the directions of electric fields and the configuration of the electrodes in the case where the vibrator is made of crystal, FIG. 27B being a cross sectional view taken along line XXVII—XXVII of FIG. 25.

FIG. 25 is a perspective view showing a vibratory gyroscope according to an eighth embodiment of the present invention. FIG. 26A is a view of explanatory showing the drive vibration mode, FIG. 26B is a view of explanatory showing the detection vibration mode of a rotating system about the Z-axis, and FIG. 26C is a view of explanatory showing the detection vibration mode of a rotating system about the Y-axis. FIG. 27A is a diagram showing the dielectric polarization directions of the piezoelectric material forming the vibrators and the configuration of electrodes. FIG. 27B is a diagram showing the directions of electric fields realized when the vibrators are made of crystal and the configuration of the electrodes. FIGS. 27A and 27B are cross sectional views taken along XXVII—XXVII of FIG. 25.

The structure of the vibratory gyroscope shown in FIG. 25 is the same as that shown in FIG. 7. The elastic member 80 has three (plate-like) vibrators 81, 82 and 83 formed integrally. The right and left vibrators 81 and 82 have, in the leading portions thereof, added masses mO extending in the X direction in the opposite directions.

As shown in FIG. 26A, the vibrators 81, 82 and 83 are vibrated in the first direction (the X direction). Similarly to the structure shown in FIG. 19, the right and left vibrators 81 and 82 and the central vibrator 83 are driven in the X direction in the opposite amplitude directions. When the vibratory gyroscope according to this embodiment is placed in a rotating system about the Z-axis, the added masses mO causes the right and left vibrators 81 and 82 to be vibrated in the X direction in the opposite amplitude direction, as shown in FIG. 26B. When the vibratory gyroscope is placed in a rotating system about the Y-axis, the right and left vibrators 81 and 82 and the central vibrator 83 are vibrated in the Z direction in the opposite amplitude directions, as shown in FIG. 26C.

In the eighth embodiment, the detection means shown in FIG. 27A or 27B is able to individually detect the vibrations in the rotating system about the Z-axis due to the Coriolis force and those in the rotating system about the Y-axis due to the Coriolis force.

FIG. 27A shows the dielectric polarization directions and the configuration of electrodes in the case where the vibrators 81, 82 and 83 are made of piezoelectric ceramic. Ground electrodes 131 are provided for the vibrators 81, 82 and 83. The drive means is formed by the drive power source 46, and drive electrodes 132, 133, 134 and 135. When high-frequency electric power in the same phase is supplied to each of the drive electrodes 132 to 135, the vibrators 81, 82 and 83 are vibrated in the mode shown in FIG. 26A.

The vibrations generated due to the Coriolis force in the rotating system about the Z-axis and shown in FIG. 26B are detected by detection electrodes 136, 137, 138 and 139. The results of detection are transmitted to the $\Omega z$ detection output terminal 141. Also in this embodiment, the detection electrodes and the detection output terminal form the detection means. The output denoting detected $\Omega z$ from the detection means is in the same phase as that of the detection voltage (or the electric current) obtained from the detection electrodes 91, 92, 93 and 94. That is, only the detection output in the rotating system about the Z-axis is obtained from the detection output terminal 141.

The vibrations generated due to the Coriolis force of the rotating system about the Y-axis and shown in FIG. 26C are obtained from the central vibrator 83. The vibrator 83 is provided with detection electrodes 142 and 143. When the vibrator 83 is vibrated in the Z direction, detection voltages (or electric currents) in the opposite phases are obtained from the two detection electrodes 142 and 143, as shown in FIG. 26C. A differential circuit 144 acts to obtain the difference between the detection outputs from the two detection electrodes 142 and 143. As a result, vibrations in the Z direction in the vibration mode shown in FIG. 26C, that is, the rotation component about the Z-axis can be detected by a $\Omega y$ detection output terminal 145.

In the structure shown in FIG. 27A, the vibration component in the rotating system about the Z-axis generated due to the Coriolis force is detected by the right and left vibrators 81 and 82. The central vibrator 83 is able to detect the vibration component generated due to the Coriolis force in the rotating system about the Y-axis.

FIG. 27B shows the case where the vibrators 81, 82 and 83 are made of crystal, the crystal orientation of which is realized by a Z-crystal plate at the cut angle rotated +2° about the X-axis. Arrows shown in FIG. 27B show the directions of electric fields. Reference numerals 153 represents ground electrodes.

When high-frequency electric power is supplied from the drive power source 46 to the two drive electrodes 153 and the drive electrode 154, the vibrators 81, 82 and 83 are driven in the vibration mode shown in FIG. 26A. The method of driving is the same as that shown in FIG. 21B.

In the vibration mode shown in FIG. 26B, the detection voltages from the detection electrodes 155 and 156 are supplied to the differential circuit 157 so that the difference is obtained, similar to the embodiment shown in FIG. 21B. Thus, the output denoting the result of detection of rotations about the Z-axis (output denoting detected nz) is obtained by a detection output terminal 159.

The vibration mode shown in FIG. 26C can be obtained in such a manner that the detection voltages from detection electrodes 161 and 162 provided for the central vibrator 83 are supplied to a differential circuit 163. Since the vibrator 83 is vibrated in the Z direction, the obtained difference between the output from the detection electrode 161 and that from the detection electrode 162 enables the output denoting the result of detection of rotations about the Y-axis (output denoting detected $\Omega y$) to be obtained at the detection output terminal 164. Also in the structure shown in FIG. 27B, the Coriolis force in the rotating system about the Z-axis is detected by the right and left vibrators 81 and 82. The central vibrator 83 is able to detect the Coriolis force in the rotating system about the Y-axis.

In the eighth embodiment shown in FIGS. 25 to 27, Coriolis forces and angular velocities in the rotating systems about the Z-axis and Y-axis can be detected. Each of the Coriolis forces in the rotating systems about the two axes can be detected by the embodiment shown in FIG. 22. Since the vibrators are driven in the Z direction in the embodiment shown in FIG. 22, the vibrators 81 and 82 are vibrated in the Z direction due to the Coriolis force in the rotating system about the Y-axis, as shown in FIG. 23B. However, each vibrator is vibrated in the X direction due to the Coriolis force in the rotating system about the Y-axis. By detecting the vibrations in the Z direction from the right and left vibrators 81 and 82 and by extracting the vibrations in the X direction from the central vibrator 83, the Coriolis forces and angular velocities in the rotating systems about the X-axis and Y-axis can be detected individually.

Ninth Embodiment

Figure 29A:
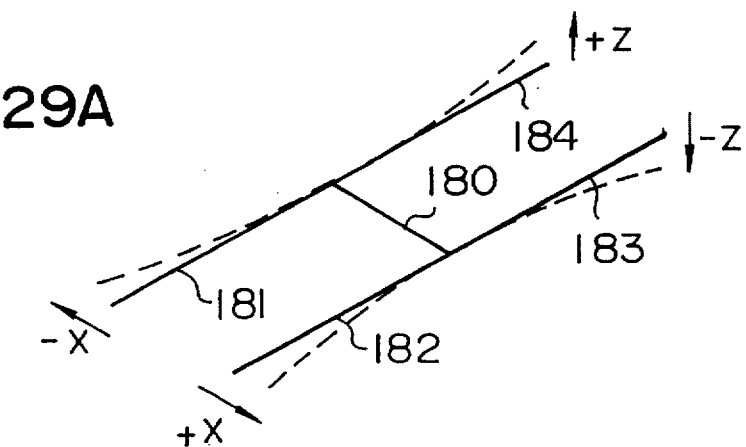
Figure 29B:
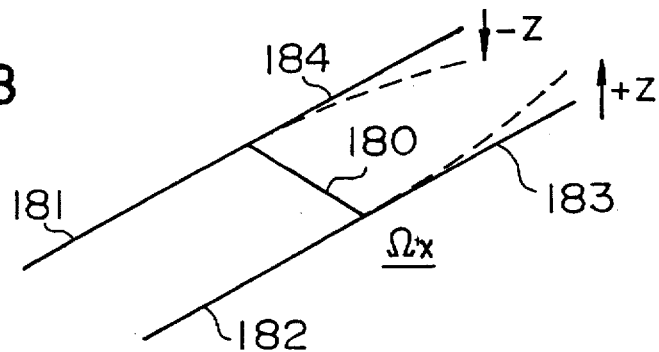
Figure 29C:
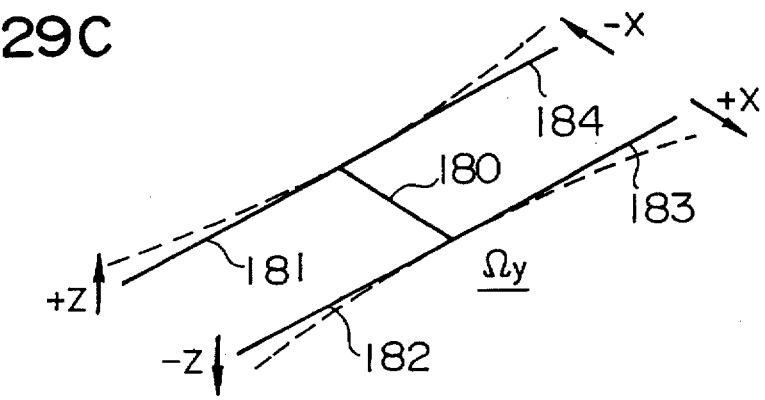
Figure 29D:
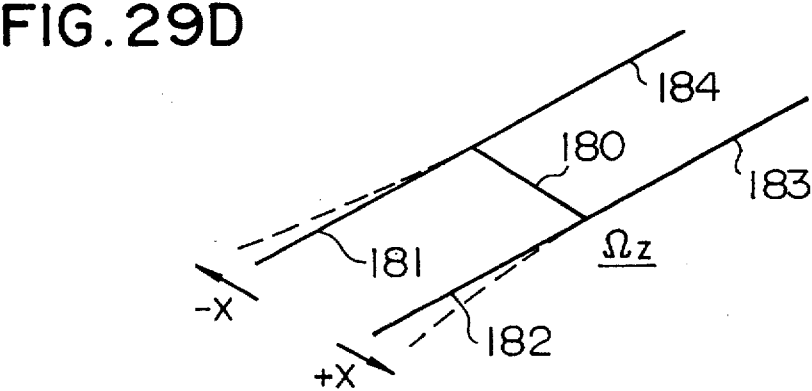
Figure 30A:
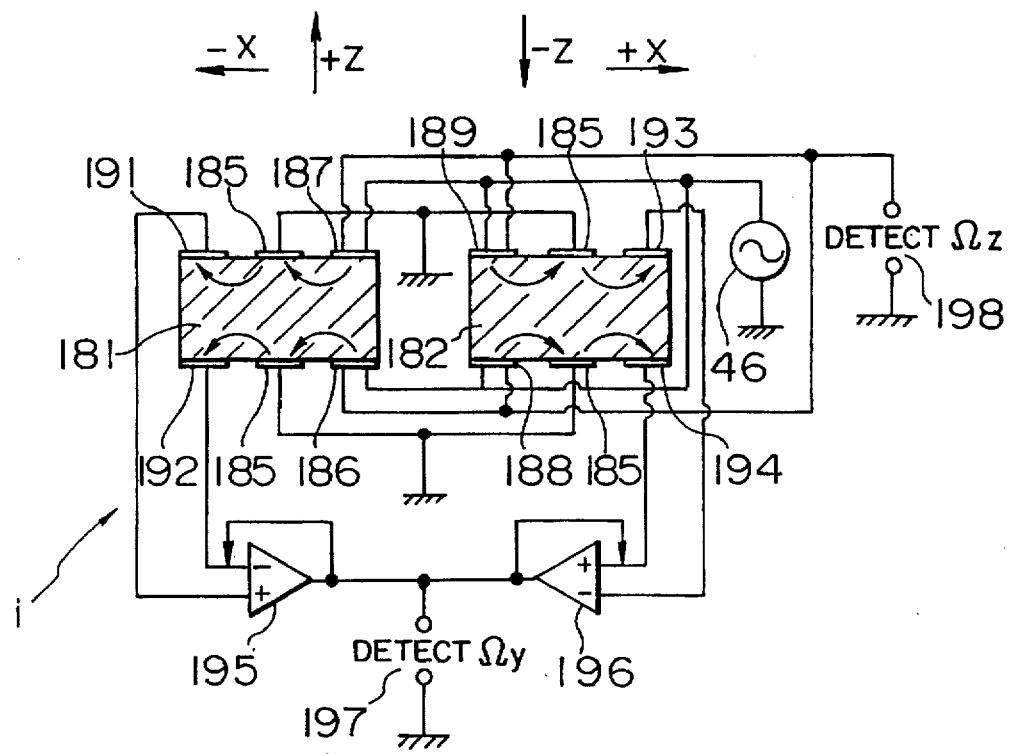
Figure 30B:
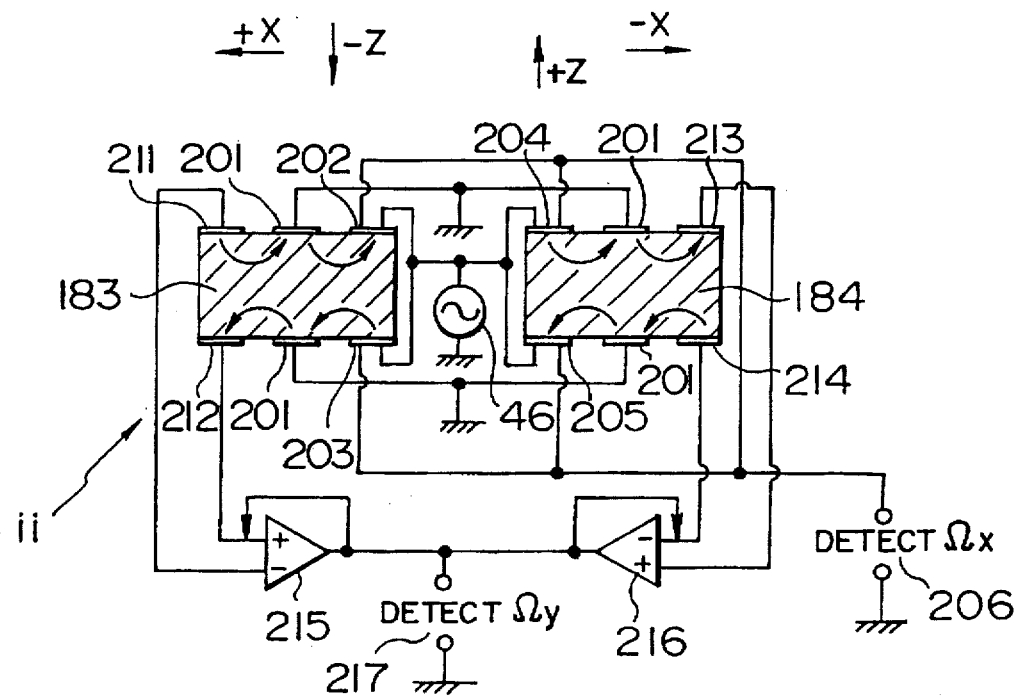

FIG. 28 is a perspective view showing a vibratory gyroscope according to a ninth embodiment of the present invention. FIG. 29 shows the vibration mode, in which FIG. 29A shows the drive mode, FIG. 29B shows the mode for detecting rotations about the X-axis, FIG. 29C shows the mode for detecting rotations about the Y-axis, and FIG. 29D shows a mode for detecting rotations about the Z-axis. FIG. 30 is a diagram showing the dielectric polarization directions of the piezoelectric material and the configuration of electrodes. FIG. 30A is a cross sectional view taken along line XXXA—XXXA of FIG. 28, and FIG. 30B is a cross sectional view taken along line XXXB—XXXB of FIG. 28.

The vibratory gyroscope according to this embodiment is arranged to be capable of individually detecting rotations about the X-axis, the Y-axis and the Z-axis. A first pair (i) of vibrators 181 and 182 are formed integrally with and extend in parallel from a first side of an elastic member 180, which is made of piezoelectric material. A second pair (ii) of vibrators 183 and 184 formed integrally extend from a second side of the elastic member 180. The vibratory gyroscope according to this embodiment has a structure that a central portion 180a of the elastic member 180 is secured to a support rod or suspended by a wire or the like.

The vibrators 181 and 182 of the first pair (i) are the same as those shown in FIG. 16 that have, in their leading portions, the added masses mO deviated in the first direction (the X direction) with respect to the central axis of the vibrators 181 and 182. In the leading portions of the vibrators 183 and 184 of the second pair (ii), the added masses mO are disposed to be deviated in the second direction (Z direction) from the central axis of the vibrators 183 and 184. Each of the vibrators is driven to a portion in which the added mass mO is provided. The vibrators 181 and 182 of the first pair (i) are vibrated in the first direction (the X direction), while the vibrators 183 and 184 of the second pair (ii) are vibrated in the second direction (the Z direction). This embodiment is characterized in that the vibrators of the first pair (i) and vibrators of the second pair (ii) extend in the opposite directions and the added masses and drive directions are perpendicular to each other.

The vibration method is, as shown in FIG. 29A, arranged such that the vibrators 181 and 182 of the first pair (i) are in the symmetrical vibration mode in which their amplitude directions oppose each other in the X direction, and the vibrators 183 and 184 of the second pair (ii) are in the symmetrical vibration mode in which their amplitude direction oppose each other in the Z direction.

When the vibratory gyroscope according to this embodiment is placed in the rotating system about the X-axis as shown in FIG. 29B, the Coriolis force does not act on the vibrators 181 and 182 of the first pair (i). That is, the Coriolis force does not act on the vibrators 181 and 182 because the vibrators 181 and 182 have no relative velocity with respect to the direction of rotation of the rotating system. Since the vibrators 183 and 184 of the second pair are driven in the opposite directions in the Z direction, the Coriolis force in the rotating system about the X-axis acts in the Y direction. Since the vibrators 183 and 184 have the added masses mO, moments in the direction of the Y-axis are generated due to the Coriolis force (+Fy). Thus, the vibrators 183 and 184 are vibrated in the opposite amplitude directions in the direction of the Z-axis (the same direction as the direction of the driving force).

Since the vibrators 181 and 182 of the first pair (i) are, as shown in FIG. 29C, vibrated in the opposite phases in the X direction in the rotating system about the Y-axis, Coriolis forces in the direction of the Z-axis acts on the vibrators. Thus, the vibrators 181 and 182 are vibrated in the opposite amplitude directions in the Z direction. The Coriolis forces in the X direction act on the vibrators 183 and 184 of the second pair (ii), which are being vibrated in the opposite phases in the Z direction. Thus, the vibrators 183 and 184 are vibrated in the opposite amplitude directions in the X direction.

Since the vibrators 183 and 184 of the second pair (ii) are, in the rotating system about the Z-axis, vibrated in the Z-axis and they have no relative velocity with respect to the direction of rotation of the rotating system, as shown in FIG. 27D, no Coriolis force acts on the vibrators 183 and 184. Since the vibrators 181 and 182 of the first pair (i) are vibrated in the X direction, the Coriolis force acts in the direction of the Y-axis. Since the vibrators 181 and 182 are vibrated in the opposite amplitude directions and the added masses mO of the two vibrators 181 and 182 are disposed in the same direction, the vibrators 181 and 182 are vibrated in the opposite amplitude directions in the X direction. By detecting the vibrations of each of the vibrators shown in FIGS. 29B, 29C and 29D, the rotations about the X-axis, the Y-axis and the Z-axis can be detected independently. In FIGS. 30A and 30B, the direction of the dielectric polarization of the piezoelectric material of each vibrator is indicated by an arrow.

The vibrators 181 and 182 of the first pair (i) shown in FIG. 30A have ground electrodes 185. The drive means is formed by a drive power source 46 and drive electrodes 186, 187, 188 and 189. When high-frequency electric power in the same phase is supplied to the drive electrodes 186, 187, 188 and 189, the vibrators 181 and 182 are driven in the opposite amplitude directions in the X direction.

The vibrations of the vibrators 181 and 182 of the first pair (i) in the Z direction are detected by detection electrodes 191, 192, 193 and 194. When the amplitude direction of the vibrator 181 is in the +Z direction and the vibrator 182 is in the −Z direction as shown in FIG. 29C, the portions of the piezoelectric material, in which the detection electrodes 191 and 194 are disposed, are negatively distorted. Conversely, the portions of the piezoelectric material, in which the detection electrodes 192 and 193 are disposed, are positively distorted. Since the dielectric polarization directions of the piezoelectric material of the portions, in which the detection electrodes 191, 192, 193 and 194 are formed, are the same, differential circuits 195 and 196 are so operated that the outputs from the electrodes 191 and 194 are input to a non-inversion portion and the outputs from the electrodes 192 and 193 are input to an inversion portion so that the output denoting the result of detection of rotations about the Y-axis (output denoting detected Ωy) is obtained from a detection output terminal 197.

The vibrators 181 and 182 are vibrated in the X direction with respect to the rotating system about the Z-axis as shown in FIG. 29D. At this time, the detection voltages (or electric currents) obtained by the detection electrodes 191, 192, 193 and 194 are in the same phase. Since the differential circuits 195 and 196 are disposed, the detection voltages in the same phase are compensated. Thus, output denoting the detected rotations about the Z-axis does not appear in the detection output terminal 197. The vibrations in the X direction shown in FIG. 29D are detected by the detection electrodes 186, 187, 188 and 189 (which as well as serve as the foregoing drive electrodes). The foregoing detection electrodes detect the vibrations in the opposite phases in the X direction shown in FIG. 29D as the voltages (or electric currents) in the same phase. Thus, the output denoting the results of the detection of the rotations about the Z-axis (output denoting the detected Ωz) can be obtained from the detection output terminal 198. Since the vibrations in the Z direction shown in FIG. 29C are detected as the outputs in the opposite phases by the detection electrodes 187 and 188 and the detection electrodes 186 and 189, the outputs are compensated and they do not appear at the detection output terminal. If the detection output is detected on the basis of the drive output (component), only the output due to only the Coriolis force can be extracted.

As shown in FIG. 30B, the vibrators 183 and 184 of the second pair (ii) comprises ground electrodes 201. The high frequency electric power is supplied from the drive power source 46 to the drive electrodes 202, 203, 204 and 205. The dielectric polarization taking place in the portions corresponding to the drive electrodes causes the vibrators 183 and 184 to be driven in the opposite amplitude directions in the Z direction (see FIG. 29A).

The drive electrodes 202, 203, 204 and 205 also serve as detection electrodes. When vibrations shown in FIG. 29B are being generated, detection voltages (or electric currents) in the same phase are obtained from the detection electrodes 202, 203, 204 and 205. Thus, the output denoting the detected rotation (the output denoting detected $\Omega x$) about the X-axis can be obtained at a detection output terminal 206.

The vibrators 183 and 184 are vibrated in the opposite phases in the X direction with respect to the rotating system about the Y-axis as shown in FIG. 29C. The outputs are in the opposite phases between the detection electrodes 202 and 205 and the detection electrodes 203 and 204 so that the outputs are compensated. Therefore, the output denoting the detected rotation about the Y-axis does not appear at the detection output terminal 206. If the outputs are detected on the basis of the drive outputs (components), only the output due to the Coriolis force can be extracted.

In the rotating system about the Y-axis, vibrators 183 and 184 are vibrated in the opposite phases in the X direction, as shown in FIG. 29C. The foregoing vibrations are detected by the detection electrodes 211, 212, 213 and 214. When the direction of the amplitudes of the vibrators 183 and 184 are made as shown in FIG. 29C, detection outputs in the same phase can be obtained at the detection electrodes 211 and 214. On the other hand, detection outputs, the phase of which are deviated from the foregoing outputs by 180°, can be obtained at the detection electrodes 212 and 213. Therefore, the outputs from the electrodes 211 and 214 are supplied to the inversion portions of differential circuits 215 and 216, whereas the outputs from the electrodes 212 and 213 are supplied to the non-inversion portions so that the output denoting the detected rotations about the Y-axis (the output denoting the detected $\Omega y$) can be obtained at the detection output terminal 217. When the vibrators 183 and 184 are vibrated in the Z direction due to the rotating system about the X-axis as shown in FIG. 29B, the outputs in the same phase obtained at the electrodes 211 and 212 are compensated in the differential circuit. 215, whereas the outputs in the same phase from the electrodes 213 and 214 are compensated in the differential circuit 216. Therefore, the component of the detected rotation about the X-axis does not appear at the detection output terminal 217.

Although the vibrators according to the fourth to ninth embodiments are formed by piezoelectric material, they may be formed by isoelastic metal similar to the first to third embodiments.

In a case where the added masses mO are provided for the vibrators in such a manner that the individual metal members or the like are secured to the vibrators, it is preferable that each added mass be about 10% to about 30% of the mass of the vibrator to which the added mass is secured.

As described above, according to the present invention, the added mass is disposed at the position deviated from the central axis of the vibrator so that, when Coriolis force acts on the added mass, the vibrator is deformed in a direction that intersects the direction in which the Coriolis force acts. Therefore, the vibrator is bending-deformed or torsionally deformed by the Coriolis force acting in a direction along the axial direction of the vibrator and the bending-deformation or the torsional deformation is detected so that the angular velocity in a rotating system running parallel to the axial direction is detected.

Therefore, when the vibrator is mounted in such a manner that its axial direction runs parallel to the surface of the substrate, the angular velocity in a rotating system running parallel to the surface of the substrate can be detected. Thus, a thin detection apparatus can be formed.

If the vibrator is in the form of a flat plate, a plurality of vibrators separated from each other by grooves are provided to enable the vibrators to be deformed alternately so that stable vibrations can be generated.

As described above, according to the present invention, the added mass is disposed at the position deviated from the central axis of the vibrator so that, when Coriolis force acts on the added mass, the vibrator is deformed in a direction that intersects the direction in which the Coriolis force acts. Thus, the rotations about an axis except the direction of the major axis of the vibrator can be detected so that the configuration of the vibrators is designed freely. As a result, the vibratory gyroscope can be disposed on a desired plane. Since the direction, in which the vibrator is vibrated by the added mass, and the driving direction coincide with each other, the rotations can be detected without an influence of the Coriolis force from a rotating system about an axis in the other direction.

Since the direction in which the vibrator is vibrated by the added mass and the direction in which the vibrator is vibrated by the Coriolis force in the other rotating system are made perpendicular to each other, Coriolis forces in rotating systems about two axes can individually be detected.

By providing two sets of the vibrators, rotations about three axes can independently be detected.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A vibratory gyroscope comprising:

an elongated vibrator having a first end, a second end, a first center of gravity, and a central axis passing from the first end to the second end through the first center of gravity;

drive means formed on the vibrator for deforming said vibrator in response to a signal having a predetermined frequency such that a portion of the vibrator located adjacent one of the first and second ends vibrates in a first direction perpendicular to the central axis;

a projection disposed on the portion of the vibrator, the projection having a second center of gravity which is displaced from the central axis such that rotation of the vibrator about an axis extending in a second direction perpendicular to the central axis during vibration of the vibrator in the first direction causes Coriolis force to act on said projection in a direction parallel to said central axis, thereby causing vibration of said vibrator in the first direction, and detection means formed on the vibrator for detecting said vibration of said vibrator in the first direction;

wherein the first direction is perpendicular to the second direction.

2. A vibratory gyroscope comprising:

a plate-like vibrator having first and second opposing surfaces, a fixed end connected to a support member, a free end and a central axis extending in a direction parallel to the first and second surfaces between the fixed end and the free end;

drive means located on the first and second surfaces for deforming said vibrator in response to a signal having a predetermined frequency such that a portion of the vibrator adjacent the free end vibrates in a first direction perpendicular to the central axis;

an added mass protruding from one of the first and second surfaces, the added mass having a center of gravity which is displaced from the central axis such that rotation of the vibrator about an axis extending in a second direction during vibration of the vibrator in the first direction causes Coriolis force to act on the added mass in a direction parallel to said central axis, thereby creating a bending moment causing the vibrator to bend in the first direction, and detection means formed on the first and second surfaces of the vibrator for detecting said bending of said vibrator in the first direction, wherein the second direction is perpendicular to the central axis and to the first direction.

3. A vibratory gyroscope according to claim 2, wherein said vibrator includes a first vibrator integrally connected to a plate-like base, the base being located at the fixed end of the vibrator, and said vibratory gyroscope further comprises:

a second vibrator integrally connected to the base and extending parallel to the first vibrator, the first and second vibrators being separated by a groove, the second vibrator having a second central axis which is parallel to the central axis of the first vibrator;

wherein said second vibrator includes an added mass protruding from a surface thereof, the added mass having a center of gravity which is displaced from the second central axis.

4. A vibratory gyroscope comprising:

an elongated vibrator having a first end, a second end and a central axis extending from the first end to the second end;

drive means formed on the vibrator for deforming said vibrator in response to a signal having a predetermined frequency such that the vibrator expands and contracts along the central axis; an added mass protruding from said vibrator, the added mass having a center of gravity which is displaced from the central axis in a first direction such that rotation of the vibrator about an axis extending in the first direction during vibration of the vibrator causes Coriolis force to act on the added in a second direction perpendicular to central axis and the first direction, thereby causing the vibrator to torsionally deform; and detection means for detecting said torsional deformation of said vibrator.

5. A vibratory gyroscope comprising:

an elongated vibrator having a first end, a second end and a central axis passing from the first end to the second end;

drive means formed on the vibrator for deforming said vibrator in response to a signal having a predetermined frequency such that a portion of the vibrator located adjacent one of the first and second ends vibrates in a first direction perpendicular to the central axis;

a projection disposed on the portion of the vibrator, the projection having a center of gravity which is displaced from the central axis in the first direction such that rotation of the vibrator about an axis extending in a second direction perpendicular to the central axis during vibration of the vibrator in the first direction causes Coriolis force to act on said projection in a direction parallel to said central axis, thereby causing vibration of said vibrator in the first direction, and detection means formed on the vibrator for detecting said vibration of said vibrator in the first direction, wherein the first direction is perpendicular to the second direction.

6. A vibratory gyroscope according to claim 5, wherein said detection means includes electrodes disposed on said vibrator for detecting a first vibration component in said first direction caused by the Coriolis force, and means for compensating a detection output due to a vibration component in the second direction when said vibrator is vibrated in said second direction by Coriolis force generated due to rotation of the vibrator about the central axis of said vibrator.

7. A vibratory gyroscope according to claim 5, further comprising a second detection means for detecting a vibration component generated in said vibrator in the second direction due to Coriolis force caused by rotation of the vibrator about the central axis, thereby enabling the vibratory gyroscope to detect rotation of the vibrator around multiple axes of rotation.

8. A vibratory gyroscope comprising:

a plurality of vibrators extending from a common base, the plurality of vibrators and the common base having a surface defining a plane, each of the plurality of vibrators including a fixed end, a free end and a central axis extending from the fixed end to the free end, the central axes of the plurality of vibrators being parallel;

drive means attached to the surface of each of the plurality of vibrators for deforming and vibrating said plurality of said vibrators in opposite amplitude directions in a first direction perpendicular to the central axes in response to signals having predetermined frequencies;

added masses disposed on at least two of the plurality of vibrators, each of the added masses having a center of gravity which is displaced from the central axis of the at least two vibrators such that Coriolis force acting on each of the at least two vibrators when said vibrators are rotated about an axis extending in a second direction perpendicular to the central axes acts on the added masses at positions deviated from the central axes, thereby causing the at least two of the plurality of vibrators to deform and vibrate in opposite amplitude directions in said first direction; and detection means formed on the surface of at least one of the plurality of vibrators for detecting said deformation and vibrations in said first direction.

9. A vibratory gyroscope according to claim 8, wherein the plurality of vibrators include a central vibrator disposed between a right vibrator and a left vibrator, wherein the central vibrator is deformed and vibrated in the first direction by said drive means in an opposite phase from said right and left vibrators.

10. A vibratory gyroscope according to claim 8, wherein the plurality of vibrators include a central vibrator disposed between a right vibrator and a left vibrator, wherein the central vibrator is deformed and vibrated in the second direction by said drive means in an opposite phase from said right and left vibrators.

11. A vibratory gyroscope according to claim 8, wherein said detection means includes electrodes disposed to detect a vibration component in said first direction and compensating a detection output due to a vibration component in a second direction when each of said vibrators is vibrated in said second direction perpendicular to said first direction due to Coriolis force given in a rotating system about a major axis of said vibrator.

12. A vibratory gyroscope according to claim 8,
wherein the plurality of vibrators include a central vibrator disposed between a right vibrator and a left vibrator;
wherein the central vibrator is deformed and vibrated in the first direction by said drive means in an opposite phase from said right and left vibrators;
wherein said added masses are disposed on said left and right vibrators;
wherein said right and left vibrators are deformed and vibrated in opposite amplitude directions in said first direction due to Coriolis force acting on said added masses of said right and left vibrators, and
wherein said detection means includes electrodes disposed to detect a vibration component in said first direction and compensating a detection output due to a vibration component in a second direction when each of said left and right vibrators is vibrated in said second direction due to Coriolis force caused by rotation of the vibratory gyroscope about the central axis of said central vibrator.

13. A vibratory gyroscope according to claim 8,
wherein the plurality of vibrators include a central vibrator located between right and left vibrators,
wherein a central vibrator is deformed and vibrated by said drive means in opposite amplitude directions in said first direction,
wherein said right and left vibrators are deformed and vibrated in opposite amplitude directions in said second direction due to Coriolis force acting on the added masses formed on said right and left vibrators, and
wherein said detection means includes electrodes disposed to detect a vibration component in said first direction and compensating a detection output due to a vibration component in a second direction when each of said left and right vibrators is vibrated in said second direction due to Coriolis force caused by rotation of the vibratory gyroscope about the central axis of said central vibrator.

14. A vibratory gyroscope according to claim 8, wherein the detection means includes electrodes disposed to detect a vibration component generated in said plurality of vibrators in the second direction indicating Coriolis force generated by rotation about the central axis of said vibrator, thereby enabling the vibratory gyroscope to detect rotations about two axes.

15. A vibratory gyroscope according to claim 14,
wherein the plurality of vibrators include a central vibrator located between right and left vibrators,
wherein a central vibrator is deformed and vibrated by said drive means in opposite amplitude directions in said first direction,
wherein said right and left vibrators are deformed and vibrated in opposite amplitude directions in said first direction due to Coriolis force acting on the added masses formed on said right and left vibrators, and
wherein said right and left vibrators and said central vibrator are deformed and vibrated in opposite phases in said second direction when Coriolis force is generated during rotation of the vibratory gyroscope around the central axis.

16. A vibratory gyroscope comprising:
a base;
a first plurality of vibrators having fixed ends integrally connected to the base and free ends, each of the first plurality of vibrators having center of gravity and a central axis extending from the fixed end to the free end through the center of gravity;
a second plurality of vibrators having fixed ends integrally connected to the base and free ends, each of the first plurality of vibrators having center of gravity and a central axis extending from the fixed end to the free end through the center of gravity;
first drive means disposed on the first plurality of vibrators for deforming and vibrating said first plurality of said vibrator in a first direction perpendicular to the central axes in response to a signal having a predetermined frequency;
a first plurality of added masses, each added mass being disposed at the free end of one of the first plurality of vibrators and having a center of gravity which is displaced from the central axis such that Coriolis force caused by rotation of the vibratory gyroscope about an axis extending in the second direction causes the first plurality of vibrators to vibrate in the first direction;
first detection means disposed on the first plurality of vibrators for detecting said vibration in said first direction resulting from Coriolis force caused by rotation of the vibratory gyroscope about an axis extending in the second direction;
second detection means for detecting a vibration component applied to said first plurality of vibrators in a second direction perpendicular to said first direction resulting from Coriolis force caused by rotation of the vibratory gyroscope about an axis extending parallel to the central axis;
second drive means disposed on the second plurality of vibrators for deforming and vibrating said second plurality of said vibrator in the second direction in response to a signal having a predetermined frequency;
a second plurality of added masses, each added mass being disposed at the free end of one of the second plurality of vibrators and having a center of gravity which is displaced from the central axis such that Coriolis force caused by rotation of the vibratory gyroscope about an axis extending in the first direction causes the second plurality of vibrators to vibrate in the second direction; and
third detection means for detecting deformation and vibrations of said second plurality of vibrators in said second direction resulting from Coriolis force caused by rotation of the vibratory gyroscope about an axis extending in the first direction.

* * * * *

UNITED STATES PATENT AND TRADEMARK OFFICE
CERTIFICATE OF CORRECTION

PATENT NO. : 5,708,320
DATED : January 13, 1998
INVENTOR(S) : Kazumasa Ohnishi et al.

It is certified that error appears in the above-indentified patent and that said Letters Patent is hereby corrected as shown below:

<u>In the Title Page</u>

In column 2, line 9, under "ABSTRACT", replace "acting" with --act--.

In Claim 4, line 13, after "added" insert --mass--.

Signed and Sealed this

Ninth Day of March, 1999

Attest:

Attesting Officer

Q. TODD DICKINSON

*Acting Commissioner of Patents and Trademarks*